United States Patent
Jiang

(10) Patent No.: US 11,485,478 B2
(45) Date of Patent: Nov. 1, 2022

(54) SYSTEMS AND METHODS FOR DETECTING PROPELLERS

(71) Applicant: SZ DJI TECHNOLOGY CO., LTD., Shenzhen (CN)

(72) Inventor: Bin Jiang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 254 days.

(21) Appl. No.: 16/869,135

(22) Filed: May 7, 2020

(65) Prior Publication Data

US 2020/0262541 A1 Aug. 20, 2020

Related U.S. Application Data

(63) Continuation of application No. PCT/CN2017/112111, filed on Nov. 21, 2017.

(51) Int. Cl.
| | |
|---|---|
| *B64C 11/04* | (2006.01) |
| *B64C 39/02* | (2006.01) |
| *B64D 45/00* | (2006.01) |
| *G06K 19/07* | (2006.01) |

(52) U.S. Cl.
CPC .......... *B64C 11/04* (2013.01); *B64C 39/024* (2013.01); *B64D 45/0005* (2013.01); *G06K 19/0728* (2013.01); *B64C 2201/027* (2013.01); *B64C 2201/108* (2013.01); *B64C 2201/146* (2013.01); *B64C 2201/165* (2013.01)

(58) Field of Classification Search
CPC ....... B64C 11/04; B64C 39/024; B64C 39/02; B64C 2201/027; B64C 2201/108; B64C 2201/146; B64C 2201/165; B64D 45/0005; G06K 19/0728

See application file for complete search history.

(56) References Cited

U.S. PATENT DOCUMENTS

| | | | | |
|---|---|---|---|---|
| 4,340,133 A | * | 7/1982 | Blersch | F16D 27/09 192/56.42 |
| 4,567,972 A | * | 2/1986 | Buch | F16D 48/064 192/111.1 |
| 5,890,441 A | * | 4/1999 | Swinson | B64C 29/0025 244/12.3 |

(Continued)

FOREIGN PATENT DOCUMENTS

| | | |
|---|---|---|
| CN | 105564634 A | 5/2016 |
| CN | 205770147 U | 12/2016 |

(Continued)

OTHER PUBLICATIONS

The World Intellectual Property Organization (WIPO) International Search Report and Written Opinion for PCT/CN2017/112111 dated Aug. 8, 2018 9 pages.

*Primary Examiner* — Brian P Wolcott
*Assistant Examiner* — Joshua R Beebe
(74) *Attorney, Agent, or Firm* — Anova Law Group, PLLC

(57) ABSTRACT

A propulsion assembly for an unmanned aerial vehicle (UAV) includes a motor configured to rotate in a first direction, a propeller seat configured to be driven by the motor to rotate in the first direction and to receive a propeller, and a sensor configured to collect sensing data useful for determining whether the propeller is locked to the propeller seat, without requiring operation of the motor.

20 Claims, 16 Drawing Sheets

(56) References Cited

U.S. PATENT DOCUMENTS

| | | | |
|---|---|---|---|
| 9,677,564 B1* | 6/2017 | Woodworth | B64D 45/00 |
| 9,994,305 B1* | 6/2018 | Moldovan | B64C 31/024 |
| 2014/0100687 A1* | 4/2014 | Ekstrom | B25C 1/06 |
| | | | 700/160 |

FOREIGN PATENT DOCUMENTS

| | | | |
|---|---|---|---|
| CN | 205872467 U | 1/2017 | |
| CN | 107186430 A | 9/2017 | |
| KR | 101686232 B1 | 12/2016 | |
| WO | 2013066477 A2 | 5/2013 | |
| WO | WO-2013066477 A2 * | 5/2013 | B64C 1/00 |
| WO | 2017049607 A1 | 3/2017 | |

\* cited by examiner

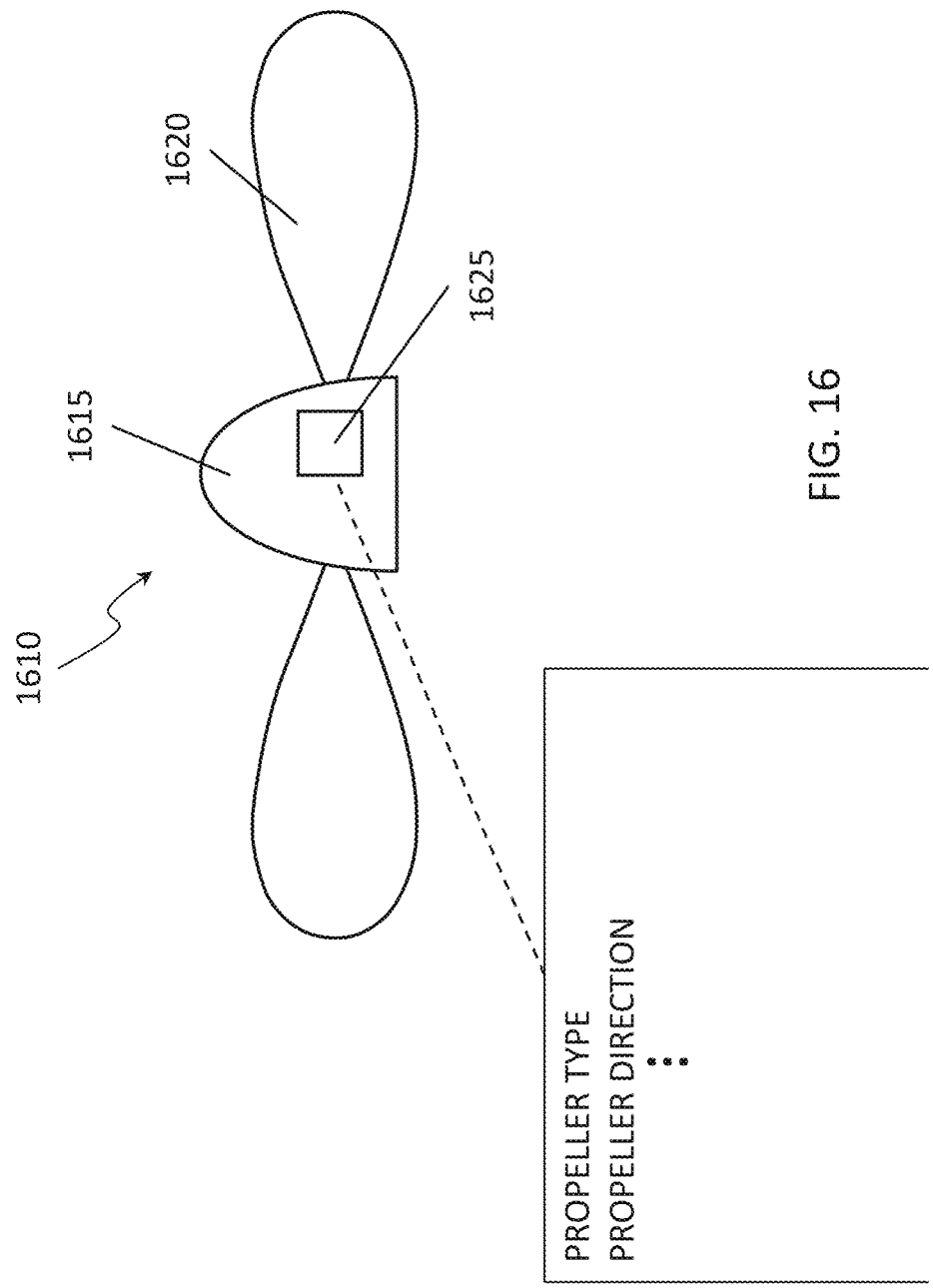

SYSTEMS AND METHODS FOR DETECTING PROPELLERS

CROSS-REFERENCE TO RELATED APPLICATION

This application is a continuation of International Application No. PCT/CN2017/112111, filed Nov. 21, 2017, the entire content of which is incorporated herein by reference.

BACKGROUND OF THE DISCLOSURE

Traditionally, unmanned aerial vehicles (UAVs) do not have a mechanism to detect if a propeller is attached successfully to a propeller seat. For instance, a propeller may be placed on the propeller seat but not be locked in. Furthermore, UAVs do not typically have a mechanism to determine if the propeller is attached to the wrong motor.

If the propeller is not securely locked to the propeller seat, or is attached to the wrong motor, the propeller may come off, or the UAV may flip or crash during flight.

SUMMARY OF THE DISCLOSURE

A need exists for systems and methods for detecting if a propeller is securely attached to a propeller seat of an unmanned aerial vehicle (UAV). A further need exists for determining whether the propeller is attached to the correct motor. In some instances, a need may exist for preventing a motor of the UAV from activating if the propeller is not secured, or is attached to the wrong motor.

Systems, methods and devices for detecting propellers are provided. The systems and methods provided herein may detect whether the propeller is locked onto a propeller seat. The system and methods provided may be capable of detecting whether the propeller is locked onto a propeller seat without activating the motors. The systems and methods provided herein may detect a spatial configuration and/or a type of propeller that may be attached to a propeller seat.

An aspect of the present disclosure is directed to a propulsion assembly for an unmanned aerial vehicle (UAV). The assembly comprises a motor configured to rotate in a first direction; a propeller seat configured to be driven by the motor to rotate in the first direction and to receive a propeller; and a sensor configured to collect sensing data useful for determining (1) when the propeller is locked to the propeller seat, and (2) when the propeller is not locked to the propeller seat, without requiring operation of the motor.

Additional aspect of the present disclosure is directed to a propulsion assembly for an unmanned aerial vehicle (UAV). The assembly comprises a motor configured to rotate in a first direction; a propeller seat configured to be driven by the motor to rotate in the first direction and to receive a propeller; and a sensor configured to collect sensing data useful for determining whether the propeller matches the propeller seat, without requiring operation of the motor.

Additional aspect of the present disclosure is directed to a method for controlling an unmanned aerial vehicle (UAV). The method comprises obtaining sensing data from a sensor disposed on or near a propeller seat of the UAV; determining a spatial configuration between the propeller seat and a propeller disposed on the propeller seat based on the sensing data; and determining whether to actuate a motor configured to drive the propeller seat based on the spatial configuration.

Additional aspect of the present disclosure is directed to an unmanned aerial vehicle (UAV). The UAV comprises a propeller seat configured to be driven by a motor and to receive a propeller; a sensor disposed on or near the propeller seat; and one or more processors configured to obtain sensing data from the sensor; determine a spatial configuration between the propeller seat and the propeller based on the sensing data; and determine whether to actuate the motor to drive the propeller seat based on the spatial configuration.

Additional aspect of the present disclosure is directed to a method for controlling an unmanned aerial vehicle (UAV). The method comprises obtaining sensing data from a sensor disposed on or near a propeller seat of the UAV; determining a type of a propeller disposed on the propeller seat based on the sensing data; and controlling the UAV based on the type of the propeller.

Additional aspect of the present disclosure is directed to an unmanned aerial vehicle (UAV). The UAV comprises a propeller seat configured to be driving by a motor and to receive a propeller; a sensor disposed on or near the propeller seat; and one or more processors configured to obtain sensing data from the sensor; determine a type of a propeller disposed on the propeller seat based on the sensing data; and control the UAV based on the type of the propeller.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIG. 16 shows an example of a radiofrequency identification (RFID) tag that may be used to aid detection, in accordance with embodiments of the disclosure.

DETAILED DESCRIPTION OF THE EMBODIMENTS

Systems, methods, and devices are provided for detecting propellers. A movable object, such as an unmanned aerial vehicle (UAV), may traverse an environment with aid of one or more propulsion units, such as propellers. The propellers may provide lift that may allow a movable object, such as a UAV to fly within an environment. The propellers may be detachable from a propeller seat of the movable object. It may be desirable to detect when the propeller is securely fastened to the propeller seat, which would allow the propeller to remain attached to the movable object during operation of the movable object. In some instances, if a propeller is not securely fastened, the motors may be prevented from activating. The UAV may be prevented from taking off. This may prevent the propeller from falling off during operation and potentially causing the movable object to crash or be damaged.

A movable object, such as a UAV, may have multiple propellers that may rotate in different directions, as driven by motors of the movable object. Propellers may be designed with different directionalities to provide a desired direction of propulsive force (e.g., upwards), when attached to the correct motor. The systems and methods provided herein may be capable of detecting the directionality of the propeller that is attached to the movable object. This may be useful in detecting whether the proper propeller is attached to the proper propulsion seat having a particular directionality of rotation. This may advantageously prevent the movable object from crashing or flipping during operation and potentially becoming damaged.

In some instances, different types of propellers may be provided. For instance, different propeller form factors may be provided for different types of flight or movement by the movable object. The systems and methods provided herein may be capable of detecting the propeller type for the propeller that is attached to the movable object. This may be useful in controlling the motors to cause the movable object to move in a manner that best utilizes the propeller type. This may allow for increased performance or efficiency of the movable object.

One or more sensors may be provided that may aid in detection of whether a propeller is securely fastened, the directionality of the propeller, and/or the type of the propeller. The sensors may be provided on-board the movable object, on-board the propeller, or a combination hereof. The sensors may be capable of detecting the information about the propeller even when a motor of the movable object is not activated. This may allow detection of the propeller information before a movable object takes off, which may prevent the movable object from taking an action that may cause the movable object to become damaged.

Figure 1:
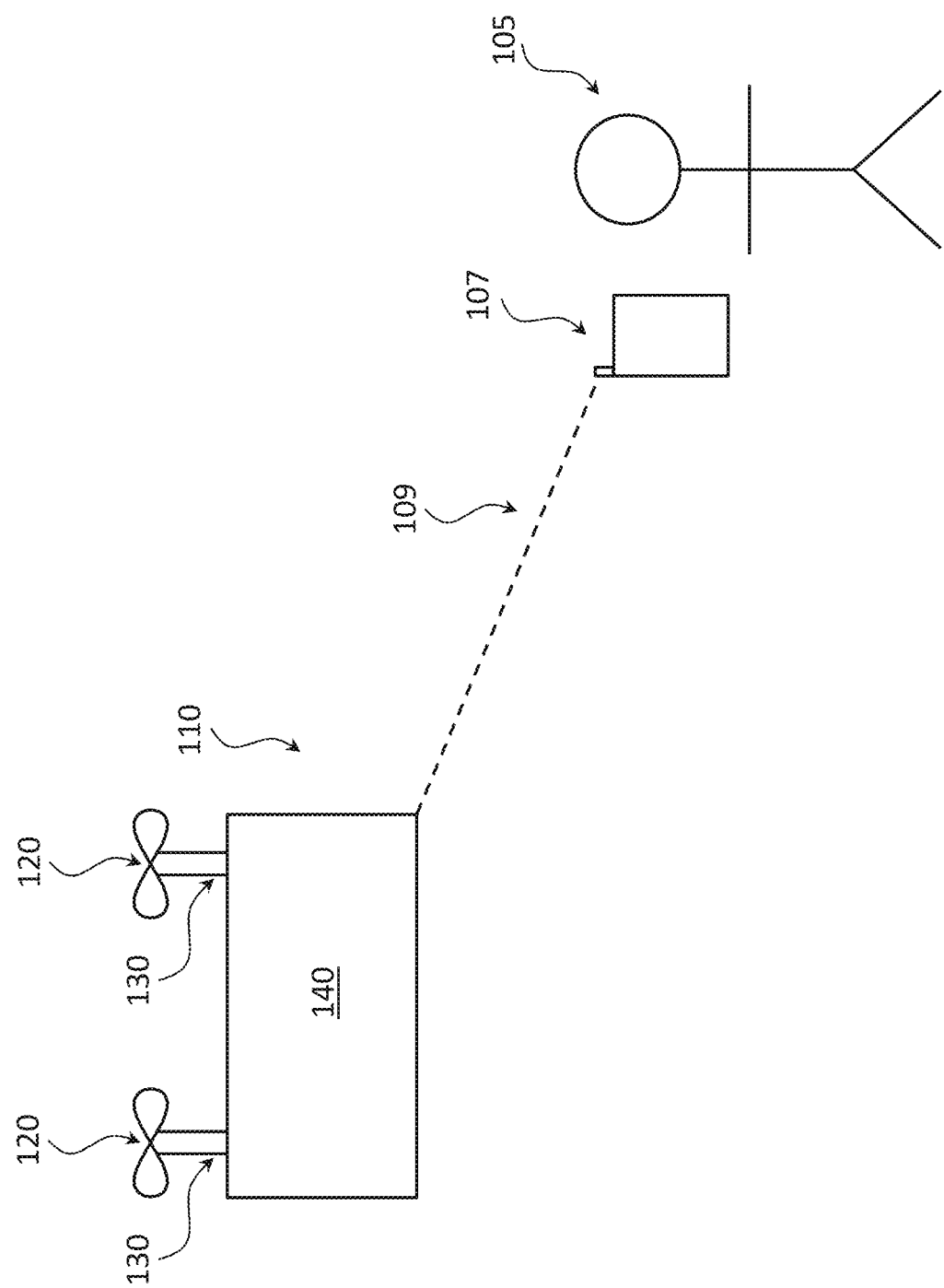
FIG. 1 shows an example of an unmanned aerial vehicle (UAV) that may be capable of flight with aid of one or more propulsion units, in accordance with embodiments of the disclosure.

FIG. 1 shows an example of an unmanned aerial vehicle (UAV) that may be capable of flight with aid of one or more propulsion units, in accordance with embodiments of the disclosure. A UAV 110 may be in communication with a remote terminal 107 which may be configured for interaction with a user 105. The UAV and the terminal may communicate with one another over a communication link 109. The UAV may comprise one or more propellers 120 that may aid in flight of the UAV. The propellers may be coupled to the UAV at one or more propeller seats 130. The UAV may optionally comprise a central body 140.

A UAV 110 may comprise one or more propulsion units that may aid in movement of the UAV. The propulsion units may comprise one or more propellers 120. The propulsion units may comprise one or more propeller seats 130 which may be configured to accept or receive the one or more propellers. Each propeller seat may be configured to receive one, two, three, or more propellers. The propeller may or may not be detachable from the propeller seat. The propulsion seat may optionally comprise a shaft driven by an actuator to effect rotation of one or more propellers. The actuator may be part of the propulsion unit. The propulsion seat may comprise one or more locking/unlocking mechanisms that may prevent the propeller from becoming detached from the UAV during operation of the UAV and/or allow the propeller to be detachable from the propulsion seat when the UAV is not in operation. The UAV may support one or more payloads.

Any description herein of a UAV 110 may apply to any type of movable object, and vice versa. A movable object may be any object capable of moving within an environment. The movable object may be capable of self-propulsion. The movable object may be capable of navigating any type of environment, such as air, land, water, and/or space. The movable object may be capable of flight. The movable object may comprise one or more propulsion units that may aid in movement of the movable object. The propulsion units may enable the movable object to be self-propelled without requiring human intervention. The propulsion units may include an actuator that may operate on electrical, magnetic, electromagnetic, chemical, biochemical, thermal, photovoltaic, or any other type of energy. The movable object may have any characteristic as described in detail elsewhere herein. The movable object may be a UAV. Any description herein of a movable object may apply to a UAV or any other type of movable object. Similarly, any description herein of a UAV may apply to any movable object, or specific type of movable object.

The movable object may be capable of any type of motion. For instance, the movable object may be capable of translation with respect to one, two, or three axes. The movable object may be capable of rotation about one, two, or three axes. The axes may be orthogonal to one another. The axes may comprise a yaw axis, pitch axis, and/or roll axis of the movable object.

The UAV may operate autonomously, semi-autonomously, or manually in response to input provided by a user 105 via a remote terminal 107. In some instances, a user may operate the UAV in a manual direct manner such that the UAV may respond directly to inputs provided by the UAV via the remote terminal. In some instances, the UAV may operate semi-autonomously. The UAV may fly in a certain manner or pattern in response to an input by the user via the remote terminal. In some instances, the UAV may fly in a fully autonomous manner without requiring inputs via the remote terminal. The UAV may fly autonomously to execute a goal or mission. The UAV may or may not automatically avoid obstacles.

In some instances, a communication link 109 may be established between the UAV and the remote terminal. The communication link may be a wireless communication link. The communication link may be a direct communication link or an indirect communication link. For example, direct communications may be provided between the UAV and the remote terminal (e.g., Bluetooth, infrared, WiFi, etc.). In some instances, indirect communications may be provided between the UAV and the remote terminal. The indirect communications may include communications over a network and/or through one or more intermediary devices. Communications may occur over a telecommunications network, data network, WAN, LAN, or any other type of network. Communications may pass through intermediary devices such as satellites, telecommunication towers, routers, etc.

The one or more propulsion units of the UAV may comprise one or more propellers 120 that may rotate to generate lift and/or thrust for the UAV. A propeller may comprise, one, two, three, four, or more rotor blades. The rotor blades may extend from a hub. The rotor blades may be stationary relative to the hub and/or one another. In some instances, the rotor blades may be movable relative to the hub and/or one another. The rotor blades may or may not be integrally formed extending from the hub. The rotor blades may or may not be detachable from the hub. One or more actuators, such as one or more motors may control rotation of the one or more propellers. A motor may be coupled to a shaft that may be coupled directly or indirectly to one or more propellers. The motor may be directly or indirectly coupled to the shaft. The motor may control rotation of the shaft. The motors may be in communication with a controller on-board the UAV. The controller may generate one or more flight commands that may be delivered to the one or more motors to affect rotation of the one or more propellers. Faster rotation of the propellers may generate more lift than lower rotation of the propellers. Rotation of the propellers may generate a lift force perpendicular to a direction at which the blades extend from the hub.

The propeller 120 may be detachable from the UAV. The propeller may be attached and/or detached to a propeller seat 130. The propeller seat and/or the propeller may comprise a locking mechanism that may allow the propeller to be secured to the propeller seat. The propeller seat may be secured to the propeller seat to prevent the propeller from coming off while the UAV is in operation and the propellers are in motion. In some instances, a user may manually attach the propeller to the propeller seat. The user may manually lock the propeller relative to the propeller seat. The user may manually lock the propeller relative to the propeller seat without requiring additional tools. The user may lock the propeller using a single hand, or using two hands. In alternative embodiments, the propeller may be locked to the propeller seat without requiring the user's touching the propeller and/or propeller seat. For example, the locking may occur automatically based on signals from a remote controller. In some instances, a propeller may be attached to the propeller seat without being locked. When the propeller is attached to the propeller seat without being locked, the propeller may come off during operation of the UAV. For instance, the propeller may come off when a motor is driving the propeller and/or when a UAV is in flight. When the propeller is locked to the propeller seat, the propeller may be configured to remain attached and not come off during operation of the UAV. For instance, the propeller may remain attached when the motor is driving the propeller and/or when a UAV is in flight. The propeller may remain attached even when the motor is driving the propeller to spin quickly. For instance, when locked, the propeller may remain attached even when the motor is operating at a rotational speed of at least 5 rpm, 10 rpm, 20 rpm, 30 rpm, 50 rpm, 100 rpm, 200 rpm, 300 rpm, 500 rpm, 1000 rpm, 1500 rpm, 2000 rpm, 2500 rpm, 3000 rpm, 3500 rpm, 4000 rpm, 4500 rpm, 5000 rpm, 6000 rpm, 7000 rpm, 8000 rpm, 9000 rpm, 10000 rpm, 15000 rpm, 20000 rpm, 30000 rpm, or 50000 rpm. A user may manually detach the propeller from the propeller seat when the UAV is no longer in operation. The user may manually unlock the propeller from the propeller seat when the UAV is no longer in operation. The user may manually unlock the propeller from the propeller seat without requiring tools. The user may manually unlock the propeller from the propeller seat using a single hand or using two hands. The user may need to manually manipulate one or more release mechanisms to permit the propeller to be unlocked. In some instances, the release mechanism may be a quick release mechanism that may require one or fewer, two or fewer, three or fewer, four or fewer, five or fewer, or six or fewer motions by the user to unlock the propeller. Examples of motions may include depressing a button or other object, flipping an extension, rotating a piece, or other types of motions. In alternative embodiments, the propeller may be unlocked from the propeller seat without requiring the user's touching the propeller and/or propeller seat. For example, the unlocking may occur automatically based on signals from a remote controller.

One or more sensors may be provided to detect whether a propeller is attached to the UAV. The one or more sensors may be provided to detect whether a propeller is locked to the UAV. The one or more sensors may determine whether the propeller is locked onto a propeller seat. The one or more sensors may be capable of determining whether the propeller is locked, even when the motor is not activated (e.g., not rotating). The one or more sensors may be capable of determining whether the propeller is locked, even when the propeller is not rotating. The one or more sensors may be capable of determining whether the propeller is locked, even prior to takeoff of the UAV. The one or more sensors may be capable of determining whether the propeller is locked, even prior to activation of motors of the UAV. In some instances, the one or more sensors do not rely on motor activity or power to determine whether the propeller is attached and/or locked. Alternatively, one or more sensors may rely on motor power or activity to determine whether the propeller is attached and/or locked.

In some embodiments, the sensors may be used to detect whether the propellers are locked correctly onto the propeller seat. In some cases, different types are propellers may be configured to lock with different types of propeller seats. Thus, the type of propeller need to match the type of propeller seat. Additionally, even when the propeller and the propeller seat match, they need to be engaged properly. The propeller and the propeller seat are correctly locked when they are coupled to each other according to a predetermined complete locking configuration, which prevents the propeller from being detached during UAV operation. The predetermined complete locking configuration may be the designated locking configuration by a manufacturer of the propeller, propeller seat, and/or UAV. The predetermined complete locking configuration does not include a partial locking configuration where the propeller and the propeller seat may be partially attached in some manner. Such partial locking may allow temporary attachment between the propeller and the propeller seat during UAV operation, but may eventual lead to detachment and/or damage of the propeller during UAV operation. In an example, the motor associated with a propeller seat may not be actuated unless the propeller matches the propeller seat and the propeller is locked to the propeller seat. In another example, only one of the above conditions may be required for actuation of the motor. In some embodiments, for a UAV with multiple motors and propeller seats, each of the propellers must match with and be locked to the respective propeller seat before any motor can be actuated. Alternatively, actuation of the motors may not require that each of the propellers match with and be locked to the respective propeller seat.

One or more propeller seats may be provided on any portion of the UAV. For instance, the one or more propeller seats may be positioned on a central body 140 of the UAV. The one or more propeller seats may be positioned on one or more arms extending away from the central body of the UAV. The one or more propeller seats may be positioned at or near a distal end of the one or more arms extending away from the central body of the UAV. For instance, the one or more propeller seats may be positioned within 50%, 40%, 30%, 25%, 20%, 15%, 10%, 5%, 3%, or 1% of the distal end of the length of the arm. The one or more propeller seats may be configured to accept one or more propellers. The one or more propeller seats may be configured to accept one or more propellers on an upper surface, a lower surface, a side surface, or both.

The one or more arms may be fixed relative to the central body of the UAV. The one or more arms may remain at a static position relative to the central body of the UAV. Alternatively, the one or more arms may move relative to the central body of the UAV. The one or more arms may pivot about one or more axes relative to the central body of the UAV. The one or more arms may pivot where the one or more arms meet the central body. In some instances, the one or more arms may have one or more joints that may permit movement of different portions of the arms. The one or more arms may be foldable. The one or more arms may pivot laterally and/or vertically.

The UAV may optionally support a load. The load may comprise one or more carriers (e.g., gimbals). The carriers may be part of the movable object or may be separate from the movable object. The carriers may be mechanically and/or electrically connected to the movable object. A controller of the UAV or separate from the controller of the UAV may issue one or more commands that may affect operation of the carriers.

One or more carriers may each support one or more payloads. In some embodiments, each carrier may support a payload. The carrier may bear weight of the corresponding payload. The carrier may be configured to control a spatial disposition of the payload. The carrier may control an orientation of the payload with respect to the movable object. The carrier may control the orientation of the payload about one axis, two axes, or three axes, with respect to the movable object. The carrier may permit rotation of the payload about one axis, two axes, or three axes, with respect to the movable object. The axes may be orthogonal to one another. The axes may comprise a yaw axis, pitch axis, and/or roll axis of a payload supported by the corresponding carrier. The carrier may control a rotational angle of the payload with respect to a yaw axis alone, pitch axis alone, roll axis alone, yaw and pitch axes, pitch and roll axes, roll and yaw axes, or all of the yaw axis, pitch axis, and roll axes. Each carrier may be a gimbal. The gimbal may be a one-axis gimbal, two-axis gimbal, or three-axis gimbal. The gimbal may comprise a frame assembly and a motor assembly. The frame assembly may comprise one or more frame components that may rotate relative to one another and/or the movable object. In one example, a gimbal assembly may comprise a first frame component that may support the payload. The payload may rotate relative to the first frame component or may rotate relative to the first frame component. The first frame component may be directly connected to the platform, or may be supported by a second frame component. The first frame component may rotate relative to the second frame component. The second frame component may bear weight of the first frame component. The second frame component may be directly connected to the platform, or may be supported by a third frame component. The third frame component may bear weight of the second frame component. The second frame component may rotate relative to the third frame component. The third frame component may bear weight of the second frame component. Any number of additional frame components may be presented.

The motor assembly may permit the frame assemblies to rotate relative to one another. For example, a first motor may permit a first frame assembly to rotate relative to the second frame assembly. A second motor may permit a second frame assembly to rotate relative to the third frame assembly. A third motor may permit a third frame assembly to rotate relative to the platform. Any number of motors may be provided. For instance, one or more, two or more, three or more, four or more, five or more, six or more, or seven or more motors may be employed.

The gimbal may comprise one or more sensors that may detect disposition and/or movement of one or more components of the gimbal. For example, the one or more sensors may be disposed on the frame assembly and/or one or more sensors may be disposed on the motor assembly. One or more sensors may be disposed on a first frame component, second frame component, and/or third frame component. One or more sensors may be disposed on or incorporated into a first motor, second motor, and/or third motor. One or more sensors may be disposed on the payload itself. One or more sensors may be disposed on the movable object. The one or more sensors may comprise inertial sensors. Inertial sensors may comprise, but are not limited to, accelerometers, gyroscopes, magnetometers, or gravity-based sensors. The inertial sensors may detect an orientation of the respective component on which it is disposed with respect to one axis, two axes, or three axes. The inertial sensors may detect movement of the respective component, such as linear velocity, angular velocity, linear acceleration, and/or angular acceleration of the respective component. The inertial sensors may be useful for detecting how a payload is oriented relative to the movable object or an inertial reference frame (e.g., the environment). The inertial sensors may be useful for detecting how a payload is moving relative to the movable object or an inertial reference frame. The inertial sensors may be useful for detecting how a respective component by which it is supported is oriented relative to the movable object or an inertial reference frame. The inertial sensors may be useful for detecting how a respective component by which it is supported is moving relative to the movable object or an inertial reference frame.

The payload may comprise one or more sensors. Any sensor suitable for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Figure 2:
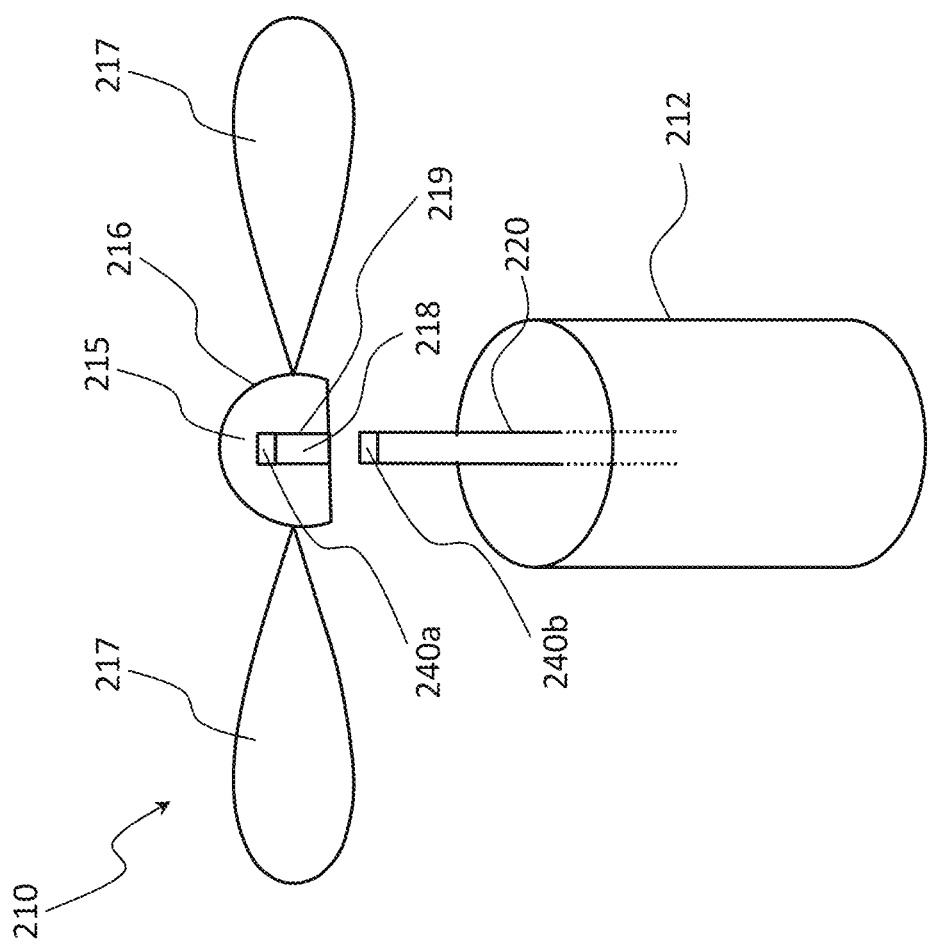
FIG. 2 shows an example of a propeller that may be accepted onto a propeller seat, in accordance with embodiments of the disclosure.

FIG. 2 shows an example of a propeller that may be accepted onto a propeller seat, in accordance with embodiments of the disclosure. A propeller 210 may comprise a hub 215 and one or more blades 217 extending from the hub. In some embodiments, a propeller seat 212 may comprise a shaft 220. In an example, the shaft may be fixedly attached to the propeller seat such that the shaft and the propeller seat rotates together. The shaft or another portion of the propeller seat may be driven to rotate by an actuator (now shown), such as a motor. The motor may have an inner rotor and an outer stator, or the motor may have an inner stator and an outer rotor. The motor may be housed at least in part inside the propeller seat. The motor may or may not directly contact the shaft. Optionally, the propeller seat may comprise a locking mechanism that may secure the propeller to the propeller seat. In some instances, one or more sensing components 240a, 240b may be provided, which may allow the detection of whether and/or how the propeller is attached and/or locked to the propeller seat and/or shaft.

A propeller 210 may comprise a central hub 215. The central hub may have any shape or profile. In some instances, the hub may have a substantially circular cross-sectional shape. The hub may have any other shape. In some instances, the hub may have a substantially triangular cross sectional shape, a quadrilateral cross sectional shape, a pentagonal cross sectional shape, a hexagonal cross sectional shape, an octagonal cross sectional shape, or any other shape. The hub may comprise an outer surface 216. The hub may optionally comprise an inner recess 218, with an interior surface 219. In some embodiments, the interior surface may be smooth. Optionally, the interior surface may comprise one or more internal features, such as threads, protrusions, grooves, slides, ramps, or any other features.

The hub may be formed from a single integral piece. Alternatively, the hub may be formed from multiple pieces. In some embodiments, the hub may comprise one or more adapters. An adapter may be permanently attached to the hub or may be removable from the hub. In some embodiments, an adapter may be inserted into an interior portion of the hub. The adapter may comprise an internal recess which may couple to a shaft. The adapter may optionally have an interior surface. In some embodiments, the interior surface may be smooth. Optionally, the interior surface may comprise one or more internal features, such as threads, protrusions, grooves, slides, ramps, or any other features. The adapter may comprise an outer surface which may mate with an internal surface of the hub, and an inner surface which may be configured to mate with a shaft. In some embodiments, an adapter may be formed on an outer portion of the hub. For instance, an adapter may partially or completely cover an outer surface of the hub.

One or more blades 217 may extend from the hub. In some embodiments, a propeller may comprise one or more, two or more, three or more, four or more, five or more, six or more, seven or more, eight or more, or ten or more blades extending from the hub. The blades may be integral to the hub. The blades and hub may be formed from a single integral piece. Alternatively, the blades and hub may be formed from multiple pieces. The blades may be attached to the hub. The blades may be permanently attached to the hub or may be removably attached to the hub. The blades may be arranged with any angle relative to one another. For instance, the blades may be arranged in a radially equidistant manner. For example, if two blades are provided, they may be arranged at about 180 degrees relative to one another. If N blades are provided, they may be arranged at about 360/N degrees relative to one another. In some embodiments, the blades may be configured to move relative to each other so as to vary the angle between the blades, e.g., to form a folded or an open configuration. The blades may each be of the same length. Alternatively, the blades may have varying lengths. The blades may each be of the same thickness. Alternatively, the blades may have varying thicknesses. The blades may each be of the same pitch. Alternatively, the blades may have varying pitches.

The propeller 210 may be attachable to a propeller seat via a shaft 220. The propeller may fit over the top of a shaft. At least a portion of the shaft may be inserted into a recess 218 of the propeller. The shaft may have any cross-sectional shape. For instance, at least a portion of the shaft may have a circular cross section, elliptical cross-section, triangular cross-section, square cross section, plus-shaped cross-section, rectangular cross-section, pentagonal cross section, hexagonal cross section, octagonal cross section, or any other shape of cross-section. The cross-sectional geometry of the shaft may remain the same throughout the length of the shaft or may vary along the length of the shaft.

The shaft may have any dimension (e.g., diagonal, diameter, width, etc.). The shaft dimensions may remain substantially the same throughout the length of the shaft or may vary along the length of the shaft. The shaft may point upward, as illustrated. Alternatively, the shaft may point downward or to the side, in which case the propeller may be configured to attach to the shaft from below or from the side.

The shaft may be sized and/or shaped so that the propeller may fit snugly relative to the propeller. The propeller may optionally not rotate relative to the shaft when fit onto the shaft. The propeller may be prevented from movement (e.g., rotation) about a vertical axis of the shaft when attached to the shaft. In some instances, the shaft geometry relative to a recess feature of the propeller may prevent the propeller from rotating relative to the shaft. In some instances, the shaft may have one or more external features that may mate with one or more internal features within the recess feature. For example, the shaft may have one or more external threads that are configured to mate with one or more internal threads within the interior recess. The shaft may have one or more interlocking mechanisms that may interlock with one or more interlocking mechanisms of the internal recess. In one example, the shaft may have one or more protrusions that may fit into one or more grooves or recesses of the interior surface of the hub. In another example, the interior surface of the hub may comprise one or more protrusions that may fit into one or more grooves or recesses of the shaft. In another example, the shaft may comprise a first fastening feature that may be configured to mate with a second fastening feature of the propeller (e.g., the hub of the propeller).

The shaft geometry or other feature may prevent the propeller from moving axially relative to the shaft when the propeller is locked to the shaft. For instance, the first fastening feature and/or the second fastening feature may prevent the propeller from moving axially relative to the shaft when the propeller is locked to the shaft. One or more threads on a shaft may mate with one or more threads in an internal recess of the propeller, which may prevent the propeller from moving axially relative to the shaft when the propeller is attached to the shaft. In another example, one or more interlocking mechanisms of the shaft may mate with one or more interlocking mechanisms in an internal recess of the propeller, which may prevent the propeller from moving axially relative to the shaft when the propeller is locked to the shaft. In some instances, the propeller may be tightened relative to the shaft when the shaft is rotating.

In some instances, one or more locking mechanisms, which may be part of the shaft, or which may be separate from the shaft may prevent the propeller from rotating relative to the shaft when the propeller is locked to the locking mechanisms. The one or more locking mechanisms, which may be part of the propeller, or which may be separate from the propeller may prevent the propeller from moving axially relative to the shaft when the propeller is locked to the locking mechanisms.

The propeller may be configured to lock to a propeller seat with aid of the locking mechanisms. An internal feature of the propeller may be useful for locking relative to the locking mechanisms. Alternatively or in addition, an external feature of the propeller may be useful for locking relative to the locking mechanism. For example, an exterior surface of the hub may comprise one or more fastening features that may mate with one or more fastening features of the locking mechanism. Examples of fastening features or locking mechanisms described herein may include, but are not limited to threads, protrusions, bumps, grooves, indentations, recess, ramps, stops, clamps, clasps, buckles, clips, latches, hooks, or any other features.

The shaft may be operably coupled to an actuator. The actuator may be motor. For instance, the motors may be magnetically driven motors, electrostatic motors, or piezoelectric motors. The motors may be mechanical commutator motors, electronic commutator motors, asynchronous machines or synchronous machines. In some instances, the motors may be servomotors. The motor may effect rotation of the shaft. The rotation of the shaft may in turn effect rotation of the one or more propellers. The motor may be capable of rotating at variable speeds. The motor may be in communication with one or more flight controllers of the UAV. The flight controller may generate a signal that may affect the speed of rotation of the motor. In some embodiments, an electronic speed control (ESC) may be in communication with the motor. The ESC may control the speed at which the motor rotates. The ESC may receive one or more signals from the flight controller of the UAV. The motor may rotate in a single direction. Alternatively, the motor may be capable of changing direction of rotation.

The propeller may optionally be tightened relative to the shaft when the motor causes rotation of the shaft. The propeller may be configured with a directionality that causes the propeller to be tightened relative to the shaft when the motor causes rotation of the shaft. Optionally, a first fastening feature and a second fastening feature may be tightened together when the motor causes rotation of the shaft. The propeller may be tightened relative to one or more locking mechanisms that may be part of the shaft or separate from the shaft when the motor causes rotation of the shaft. The propeller may remain attached to the shaft when the propeller has been locked relative to the shaft. The propeller may remain attached to the one or more locking mechanisms that may be part of the shaft or separate from the shaft, when the motor is causing rotation of the shaft.

One or more sensing components 240a, 240b may be provided to aid in detecting when a propeller is attached to the shaft, and/or when the propeller is locked relative to the shaft. The one or more sensing components may be provided to aid in detecting when a propeller is secured with aid of a locking mechanism. The one or more sensing components may be able to differentiate when a propeller is attached but not locked, versus when a propeller is locked.

The one or more sensing components may be provided on a shaft, on a propeller (e.g., hub of the propeller and/or blade of the propeller), on a propeller seat, on a locking mechanism, or any combination thereof. In some embodiments, the one or more sensing components may be positioned on or in an arm or central body of a UAV. The one or more sensing components may be positioned in a close proximity to a location where a propeller would attach to the UAV. For instance, the one or more sensing components may be within 10 cm, 7 cm, 5 cm, 5 cm, 4 cm, 3 cm, 2.5 cm, 2 cm, 1.5 cm, 1 cm, 0.7 cm, 0.5 cm, 0.3 cm, or 0.1 cm of where a propeller may be locked onto a UAV.

The sensing components may comprise a sensor 240b and/or an object 240a that may be detected by the sensor. In one example, a single sensing component may be provided. For example, a sensor alone may be provided. In other instances, multiple sensing components may be provided. For example, multiple sensors may be provided. In another example, one or more sensors and one or more objects that may be detected by a sensor may be provided.

In one example, a sensor 240b may be provided on or near a shaft. The sensor may be provided in direct contact with a shaft or in a close proximity to the shaft. The sensor may be operably coupled to the shaft. The sensor may be provided on or near a locking mechanism. The sensor may be provided in direct contact with the locking mechanism or in close proximity to the locking mechanism. The sensor may be operably coupled to the locking mechanism. The one or more objects 240a that may be detected by the sensor may be on the propeller. The one or more objects to be detected by the sensor may be within a propeller, embedded into a propeller, or on a surface of the propeller (e.g., outer surface or inner surface of the propeller). The one or more objects to be detected by the sensor may be on or in a hub of the propeller, or on or in a blade of the propeller. In some embodiments, an object to be detected by the sensor may be an on exterior surface of the propeller hub or blade, or within an inner recess of the hub.

Alternatively or in addition, a sensor may be provided on the propeller. One or more sensors may be within a propeller, embedded into a propeller, or on a surface of the propeller. The one or more sensors may be on or in a hub of the propeller, or on or in a blade of the propeller. In some embodiments, a sensor may be an on exterior surface of the propeller hub or blade, or within an inner recess of the hub. An object to be detected by the sensor may be provided on or near a shaft. The object may be provided in direct contact with a shaft or in a close proximity to the shaft. The object may be embedded into the shaft. The object may be operably coupled to the shaft. The object may be provided on or near a locking mechanism. The object may be provided in direct contact with the locking mechanism or in close proximity to the locking mechanism. The object may be embedded into the locking mechanism. The object may be operably coupled to the locking mechanism.

In some embodiments a single sensor and a single object to be sensed may be employed. In other embodiments, a single sensor and multiple objects to be sensed may be employed, or multiple sensors and a single object to be sensed may be employed, or multiple sensors and multiple objects to be sensed may be employed. They may be distributed in any combination on the propeller, shaft, and/or locking mechanism.

A sensor may be capable of collecting external information. External information may comprise data outside the UAV. External information may comprise data beyond operating conditions of the UAV. A sensor may be collecting images, wireless signals, reflected signals (e.g., reflected ultrasonic or laser signals), magnetic readings, temperature information, or electrical signals. A sensor may collect information that is beyond energy input to a motor, and/or energy output from a motor. Examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., Hall sensors, magnetometers, electromagnetic sensors). In alternative embodiments, the sensor may be capable of collecting internal information. Internal information may comprise data within the UAV. International information may comprise data about operating conditions of the UAV, such as power level, power output, power consumption, attitude of UAV, or similar information.

An object to be detected by the sensor may be any type of physical object, component, material, wave, or emission. In one example, an object to be sensed may be a material that may be detected by a Hall sensor. For example, an object to be sensed by may be a magnet. In another example, an object to be sensed may be an object that completes an electric circuit, and a completion of the circuit may be detected by the circuit. An object to be sensed may have varying resistance levels or capacitance levels that may be measured. In some instances, an object to be sensed may be a visual marker or object that may be detected by a camera. In an example, the object may be a light-emitting or sound-emitting source. The light or sound emitted by the object may be detected or measured by a sensor. In another example, an object to be sensed may be a heat-emitting device that may be detected by an infrared camera. Optionally, an object to be sensed may be an RFID tag that may be sensed by an RF reader.

In some embodiments, the sensor may have a binary detection of the object to be sensed (e.g., detecting presence or absence of object to be sensed). For example, the sensor may detect whether a circuit is completed or is not completed. In other embodiments, the sensor may detect a gradation or varying levels. For instance, the sensor may detect a distance from a magnetic based on the strength of the signal measured. In another instance, the sensor may measure an electrical resistance level of an object.

Figure 3:
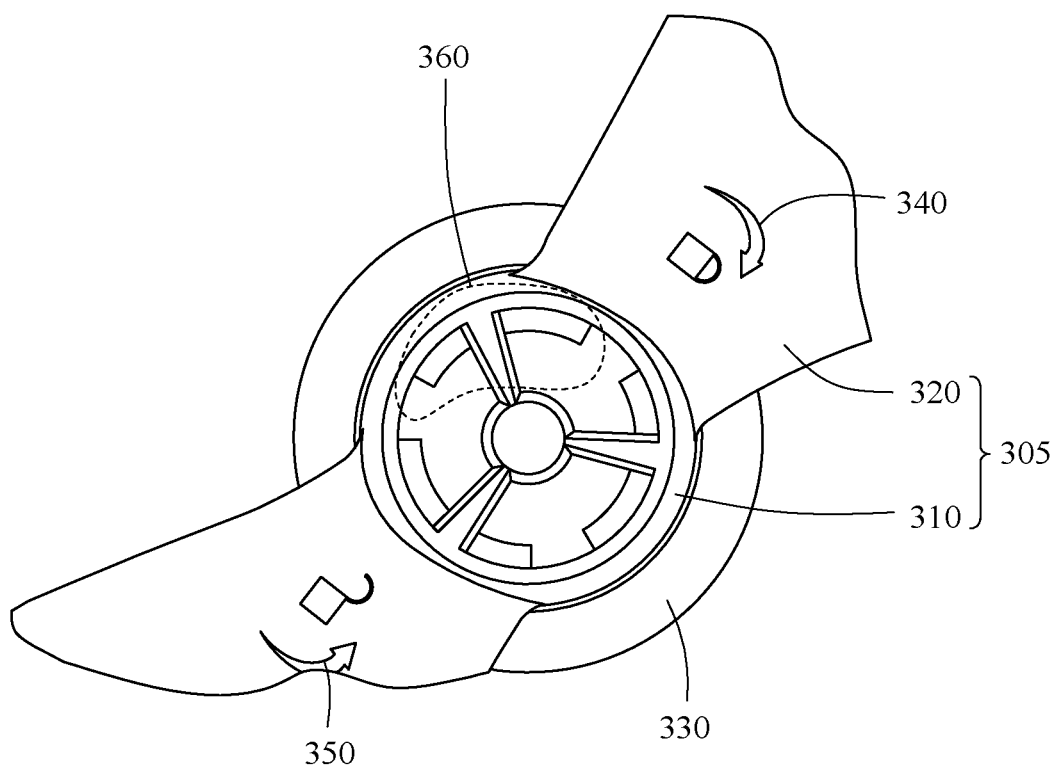
FIG. 3 shows an example of a top view of a propeller that may be attached to a propeller seat, in accordance with embodiments of the disclosure.

FIG. 3 shows an example of a top view of a propeller that may be attached to a propeller seat, in accordance with embodiments of the disclosure. The propeller 305 may comprise a hub 310 and one or more blades 320. The propeller may be mounted onto a propeller seat 330. For example, the propeller may be attached to a shaft of a propeller seat. A propeller may be rotated in a first direction 340 to lock the propeller onto the propeller seat. The propeller may be rotated in a second direction 350 to unlock the propeller from the propeller seat. The propeller and/or propeller seat may comprise one or more locking mechanisms 360 that may aid in locking the propeller to the propeller seat. In addition to lock and/or unlock the propeller from the propeller seat, optionally one or more additional motions (other than rotation in the first direction or section direction) may be required. Alternatively, additional motions may not be required. In some instances, additional motions may not be required to lock the propeller, but additional motors may be required to unlock the propeller.

The propeller 305 may be attachable and/or detachable from a UAV. The propeller may comprise a hub 310 and one or more blades 320. The one or more blades may radiate from the hub. The hub 310 may have a closed top or an open top. For instance, the hub may comprise one or more openings that may allow a user to view some of the mechanisms inside. The hub may comprise one or more openings that may allow a user to view the progress of the propeller being locked onto the UAV. The user may not be able to determine, from visual inspection, whether the propeller is locked onto the UAV.

The UAV may comprise a propeller seat 330. The propeller seat may comprise a region of the UAV to which the propeller 305 may be attached. The propeller seat may be on a central body of the UAV or on an arm extending away from a central body of the UAV. The propeller seat may be at or near a distal end of the arm extending away from the central body. The propeller seat may comprise one or more supporting mechanisms that may be configured to accept the propeller. For instance, the propeller seat may comprise a locking mechanism that may aid in locking the propeller to the propeller seat. The propeller may comprise a portion that may bear weight of the propeller. The propeller seat may comprise or be attached to a rotating component of an actuator assembly such as a rotor shaft. The propeller seat and/or the shaft that may be directly or indirectly coupled to the propeller. The propeller seat may or may not comprise an adapter or other intermediary portions between the shaft and the propeller. The propeller seat may or may not comprise an actuator assembly that may drive rotation of the propeller seat and/or shaft.

The propeller may be rotated in a first direction 340 relative to the propeller seat to lock the propeller onto the propeller seat. The first direction may be a clockwise direction or a counterclockwise direction. The locking directionality may depend on or be configured to match the directionality of the propeller being attached to the propeller seat. The locking directionality may depend on or be configured to match the pitch of the blades of the propeller being attached to the propeller seat.

The propeller may be rotated in a second direction 350 relative to the propeller seat to unlock the propeller from the propeller seat. The second direction may be a counterclockwise direction or a clockwise direction. The second direction may be different from the first direction. The second direction may be opposite the first direction. The unlocking directionality may depend on or be configured to match the directionality of the propeller being attached to the propeller seat. The unlocking directionality may depend on or be configured to match the pitch of the blades of the propeller being attached to the propeller seat.

In some embodiments, additional motions may or may not be included in locking and/or unlocking the propeller from the propeller seat. For instance, the propeller may be pushed down onto the propeller seat, and then twisted in the locking direction to lock it with the propeller seat. Likewise, the propeller may be twisted in the unlocking direction and then lifted to unlock it from the propeller seat. In another example, a button may be depressed or other locking mechanism component may be manipulated to allow the propeller to be locked/unlocked with the propeller seat.

An example of a locking mechanism 360 is illustrated. The locking mechanism may comprise one or more locking components on the propeller seat such as illustrated. For example, the locking components of the propeller seat may be arranged along a peripheral area of propeller seat or shaft. Alternatively or in addition, the locking mechanism may comprise one or more locking components on the propeller, such as on the hub of the propeller. For example, the propeller locking components may be arranged concentrically with respect to a rotation axis of the hub on an interior surface or on an exterior surface of the hub. The one or more locking components on the propeller seat and the one or more locking components on the propeller may be configured to engage with each other (e.g., when the propeller is pushed down on the propeller seat and twisted in the locking direction, or when one or more buckles or hooks on the propeller seat are coupled with the corresponding propeller counterparts) to allow the propeller to be locked to the propeller seat. The one or more locking components on the propeller seat and the one or more locking components on the propeller may be configured to disengage with each other (e.g., when the propeller is twisted in the unlocking direction and lifted from the propeller seat or when the one or more buckles or hooks on the propeller seat are released from the corresponding propeller counterparts) to allow the propeller to be unlocked from the propeller seat.

Figure 4:
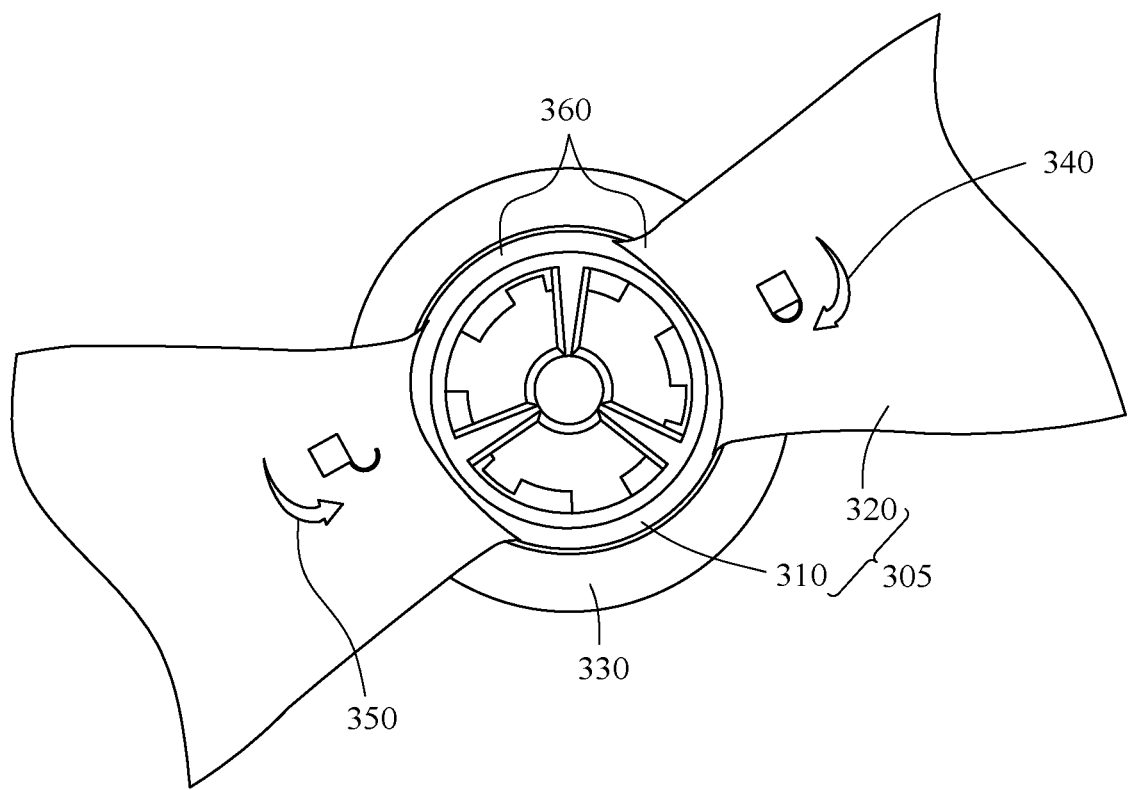
FIG. 4 shows an example of a top view of a propeller that may be rotated to lock the propeller to the propeller seat, in accordance with embodiments of the disclosure.

FIG. 4 shows an example of a top view of a propeller that may be rotated to lock the propeller to the propeller seat, in accordance with embodiments of the disclosure. The propeller 305 may be rotated in a first direction 340 to be partially locked to the propeller seat 330.

Figure 5:
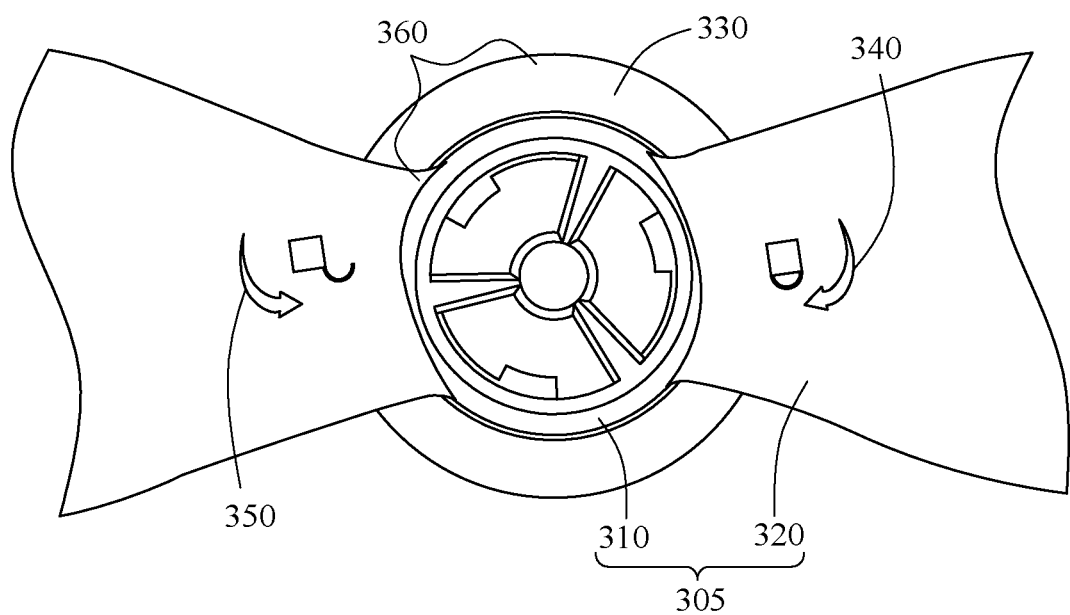
FIG. 5 shows an example of a top view of a propeller that may be rotated all the way to completely lock the propeller to the propeller seat, in accordance with embodiments of the disclosure.

FIG. 5 shows an example of a top view of a propeller that may be rotated all the way to completely lock the propeller to the propeller seat, in accordance with embodiments of the disclosure. The propeller 305 may be rotated all the way in a first direction 340 to be completely locked to the propeller seat 330.

In some embodiments, a locking mechanism 360 may comprise a stopping point. The stopping point may be when the propeller cannot be turned in the first direction any further. One or more stoppers on the propeller seat and/or the propeller may prevent the propeller from turning any further. In some embodiments, the propeller may be completely locked when it cannot turn in the first direction any further.

Optionally, when a propeller reaches a point where it cannot turn anymore, additional locking mechanisms may be provided to prevent the propeller from turning back in the second direction. For example, a spring loaded mechanism may be provided that may pop up to prevent the propeller from turning in the second direction. In some instances, deformable portions may flex as the propeller is being rotated in the first direction, and may spring into its original or natural position when the propeller reaches the point where the propeller cannot turn any further. By restoring to its natural position, the deformable portion may prevent the propeller from rotating in the second direction. Alternative moving mechanisms such as pins, ramps, balls, or protrusions may be used to locking the propeller into place by preventing the propeller from rotating in the second direction when the propeller has been rotated to the end in the first direction. A user may manually manipulate a mechanism to allow the propeller to become unlocked and rotate in the second direction. For example, a user may depress a button, flip a switch, move a slider, press down on the propeller or take any other action to allow the propeller to rotate in the second direction.

In alternative embodiments, there need not be additional locking mechanisms that prevent the propeller from turning back in the second direction when the propeller reaches the stopping point in the first direction. In some embodiments, the locking mechanisms and propellers may be configured so that the rotation of the shaft causes further tightening of the propeller relative to the propeller seat.

In some embodiments, a sensor may be able to detect when the propeller is attached to the propeller seat but not necessarily completely tightened. The sensor may or may not detect when the propeller is attached to the propeller seat but is not tightened or is only partially tightened. The sensor may detect when the propeller is locked relative to the propeller seat. The sensor may detect when the propeller cannot turn any more in the first direction. The sensor may detect when a locking component has moved to prevent the propeller from turning back in the second direction without manual intervention by a user. The sensor may be provided on the propeller seat, the propeller, or any combination thereof.

Figure 6:
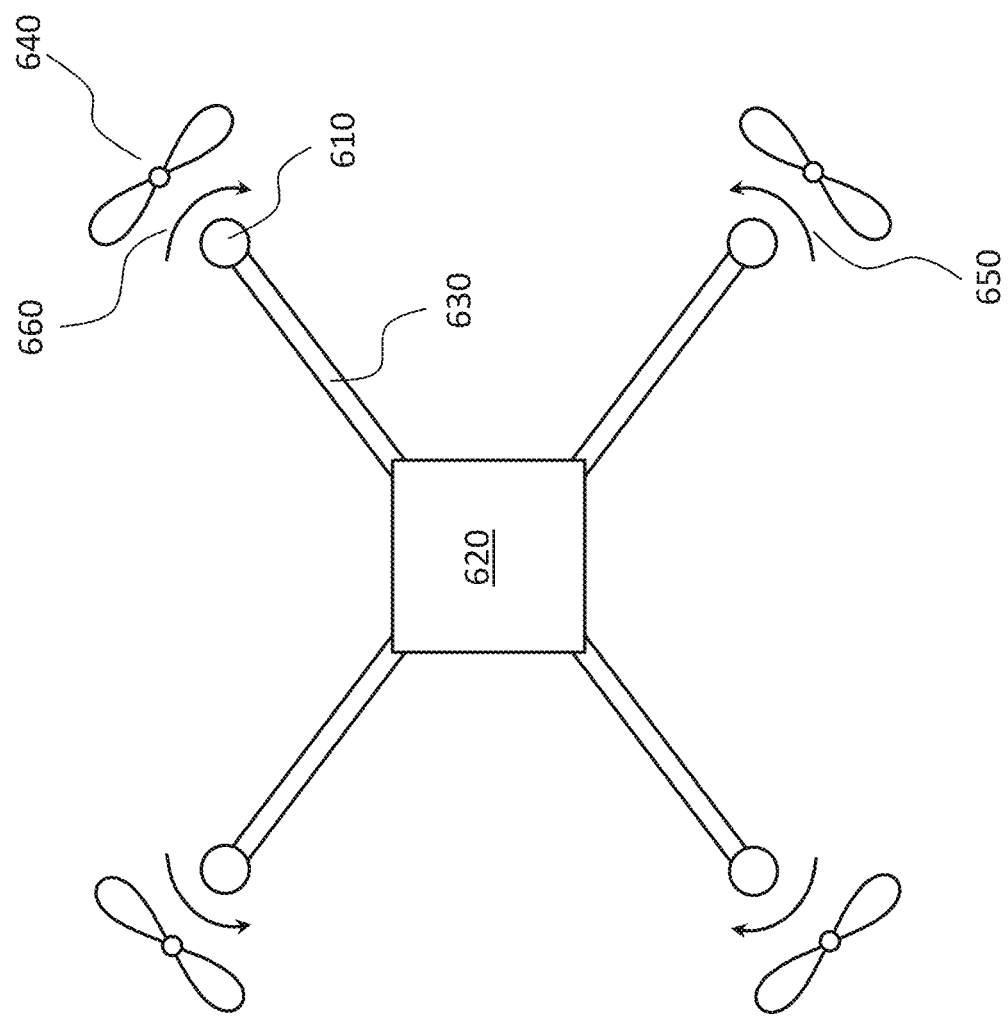
FIG. 6 shows an example of how a UAV may have motors spinning in different directions, with different directionalities of propellers, in accordance with embodiments of the disclosure.

FIG. 6 shows an example of how a UAV may have motors spinning in different directions, with different directionalities of propellers, in accordance with embodiments of the disclosure. In some embodiments, a UAV may comprise a plurality of propeller seats 610. The propeller seats may be provided on a central body 620 or on one or more arms 630 extending away from the central body. The propeller seats may be configured to receive one or more propellers 640. The propellers may be configured to rotate in different directions 650, 660.

In some embodiments, a UAV may comprise one or more propeller seats 610. The propeller seats may be configured to accept and/or engage with any number of propellers 640. The propeller seat may be used to attach a propeller to the UAV. Any number of propeller seats may be provided. For instance, one or more, two or more, three or more, four or more, five or more, six or more, seven or more, eight or more, ten or more, twelve or more, sixteen or more, twenty or more, or thirty or more propeller seats may be provided. In some embodiments, an even number of propellers seats may be provided. In some other embodiments, an odd number of propellers seats may be provided.

Each propeller seat may be configured to support and accept (or receive) one or more propeller. A propeller seat may be configured to accept a single propeller. Alternatively, a propeller seat may be configured to accept two or more, three or more, four or more, or any other number of propellers.

The propeller seats may be located anywhere on the UAV. In some embodiments, the propeller seats may be located on a central body 620 of the UAV. The propeller seats may be located directly on the central body or on one or more intermediary components supported by the central body. In some embodiments, one or more propeller seats may be located on a housing of the central body.

In some embodiments, the propeller seats may be located on one or more arms 630 extending away from the central body. The one or more arms may be fixed relative to the central body or may move relative to the central body. The one or more arms may remain static relative to the central body when the UAV is in flight, or when the UAV is not flying. Alternatively, the one or more arms may be configured to be movable relative to the central body while the UAV is in flight, and/or while the UAV is not flying. The one or more arms may be configured to extend and/or retract substantially horizontally relative to the central body. The one or more arms may extend radially from the central body. The one or more arms may be positioned at equal angles relative to one another. Alternatively, the one or more arms may be positioned at uneven angles relative to one another. In some embodiments, the one or more arms may be configured to tilt upwards or downwards relative to the central body. The one or more arms may or may not change a vertical tilt. The one or more arms may or may not change a horizontal position.

Each arm may support a single propeller seat. Alternatively, each arm may support two or more propeller seats. In some embodiments, the arms may have a substantially linear shape extending from the body. The arms may or may not bend at one or more joints, or at a proximal portion where the arm may meet the central body. The arms may have any other shape, such as a T-shape, Y-shape, L-shape. In some embodiments, propeller seat(s) may be positioned at a distal end of the arm, or anywhere along the length of the arm. In one example, for a branching configuration, such as a T-shape or Y-shape, the propeller seats may be provided at terminal distal ends of the T, and/or the terminal distal ends of the Y.

Each propeller seat may be configured to accept one or more propellers 640. In some embodiments, each propeller may have a directionality. The directionality may depend on the direction of pitch of the propeller blades. For example, a first propeller may be configured to rotate in a first direction 650 to generate lift for the UAV. A second propeller may be configured to rotate in a second direction 660 different from the first direction to generate lift for the UAV.

The propellers 640 may be configured to be disposed or positioned on corresponding propeller seats. For example, a first propeller configured to rotate in a first direction to generate lift may be attached to a first type of propeller seat. The first type of propeller seat may comprise a shaft that may be driven by a motor to rotate the shaft in the first direction. A second propeller configured to rotate in a second direction to generate lift may be attached to a second type of propeller seat. The second type of propeller seat may comprise a shaft that may be driven by a motor to rotate the shaft in the second direction. Each propeller may be attached to a propeller seat that may be configured to rotate in the propeller in a direction that causes the propeller to generate lift.

In some embodiments, the UAV may comprise a first group of propeller seats of the first type and a second group of propeller seats of the second type. In some embodiments, the same number of propeller seats may be provided in the first group and in the second group. The propeller seats may be arranged in an alternating fashion, so that a first type of propeller seat is positioned adjacent to a second type of propeller seat, etc. In one example, a first pair of propeller seats of the first type is provided, and a second pair of propeller seats of the second type is provided. The propeller seats of the first type are located opposite one another and adjacent to propeller seats of the second type. Similarly, the propeller seats of the second type are located opposite one another and are adjacent to propeller seats of the second type. The propeller seats may be arranged so that when the propellers are attached and rotated, the torques generated by the rotating propeller blades cancel each other out, and the UAV is able to rise.

One or more sensing components may be provided to detect the presence of the propellers relative to the propeller seats. For example, one or more sensing components may be provided for each propeller seat and may be configured to detect when the propeller is attached to the propeller seat. In some embodiments, one or more sensing components may be provided for each propeller which may be configured to detect when the propeller is locked to the propeller seat. In some embodiments, the one or more sensing components may comprise one or more sensors and/or one or more objects to be sensed. In some embodiments, one or more sensors may be provided at each propeller seat. One or more objects to be sensed by the sensors may or may not be provided on the propellers.

The one or more sensors may be powered by a power source. The power source may be provided locally at the propeller seat. The power source may be devoted to the sensor. Alternatively or in addition, the power source may be a power source for the entire UAV. The power source may be provided on-board the central body (e.g., within the central body, or on the central body), on-board the arms (e.g., within or on an arm), and/or on-board the propeller seat (e.g., within or on a propeller seat or portion of the arm supporting the propeller seat). The power source may provide power to other components of the UAVs, such as the motors that may drive the shafts to rotate the propellers of the UAV. The one or more objects to the sensed may or may not be powered by a power source.

In some embodiments, one or more sensors may be provided on-board the propeller. One or more objects to be sensed by the sensors may be provided at the propeller seat.

The one or more sensors may be powered by a power source. The power source may be provided locally on-board the propeller. The power source may be devoted to the sensor. Alternatively or in addition, the power source may be provided on-board the UAV. The power source may be provided on-board the central body (e.g., within the central body, or on the central body), on-board the arms (e.g., within or on an arm), and/or on-board the propeller seat (e.g., within or on a propeller seat or portion of the arm supporting the propeller seat). The power source may provide power to the sensor alone, or other components of the UAVs, such as the motors that may drive the shafts to rotate the propellers of the UAV. The power source on-board the UAV may provide power to a sensor on the propeller of the UAV when the propeller is attached to the propeller seat. The power source on-board the UAV may provide power to a sensor on the propeller of the UAV when the propeller is locked to the propeller seat. In some instances, the power source on-board the UAV may not be providing power to the sensor on-board the propeller if the propeller is not attached to the propeller seat, or is not locked to the propeller seat. The one or more objects to the sensed may or may not be powered by a power source.

In some embodiments, the sensor may detect whether the propeller attached or locked to the propeller seat has the same directionality as the propeller seat. For instance, a propeller may have a first directionality when the propeller is configured to generate lift when rotated in the first direction. The propeller seat may have the first directionality when the propeller seat comprises a shaft driven by a motor configured to rotate the propeller in the first direction to generate lift. The propeller seat and the propeller may have the same directionality when the propeller seat causes the propeller to rotate in a direction that generates lift. It is desirable to detect whether the propeller is attached to the propeller seat of the same directionality before activating the motor. Otherwise, when the motor starts driving the propellers to rotate, the propellers may fall off the propeller seats, and/or may provide a downward thrust instead of an upwards thrust, and cause the UAV to topple or crash.

In some embodiments, it may be possible to attached a propeller and a propeller seat that are of different directionalities. Alternatively, the propeller may be configured to not attach to the propeller seat when the propeller is not of the same directionality as the propeller seat. A propeller may lock to the propeller seat even when the propeller is not of the same directionality as the propeller seat. Alternatively, a propeller may not be configured to lock onto the propeller seat when the propeller is not of the same directionality of the propeller seat. The sensors may be configured to detect the incompatibility between the propeller and the propeller seat despite the fact that they are attached and/or locked to each other, e.g., without turning on the motors.

A sensor may be able to detect a directionality of the propeller. A sensor may be able to detect whether the directionality of the propeller matches the directionality of the propeller seat, or does not match the directionality of the propeller seat. In one example, the propeller seat may comprise a sensor and the propeller may comprise an object to be sensed. The object to be sensed may have a different characteristic depending on the directionality of the propeller. The sensor may be able to distinguish the different characteristics of the object to be sensed, and may be able to differentiate the directionality of the propeller. In another example, the propeller may comprise a sensor and the propeller seat may comprise the object to be sensed. The object to be sensed may have a different characteristic depending on the directionality of the propeller seat. The sensor may be able to distinguish the characteristic and differentiate the directionality of the propeller seat.

The sensor may be able to detect the directionality of the propeller when the propeller is within a proximity of the propeller seat, and/or the sensor. The sensor may be able to detect the directionality of the propeller when the propeller is attached to the propeller seat. The sensor may be able to detect the directionality of the propeller when the propeller is locked to the propeller seat. The propeller may be able to detect the directionality of the propeller when the propeller is attached but not locked to the propeller seat.

A propulsion assembly for a UAV may comprise a plurality of motors, wherein a first motor of said plurality is configured to rotate in a first direction, and a second motor of said plurality is configured to rotate in a second direction. A plurality of shafts may be provided, wherein a first shaft of said plurality is in communication with the first motor, configured to rotate in the first direction, and configured to accept a first configuration of propeller (e.g., first directionality of propeller). A second shaft of said plurality may be in communication with the second motor, configured to rotate in the second direction, and configured to accept a second configuration of propeller (e.g., second directionality of propeller). One or more processors may be configured to determine whether a propeller attached to the first shaft has the first configuration of propeller or the second configuration of propeller. The first configuration of propeller may be configured to generate lift for the UAV when rotated in the first direction. The second configuration of propeller may be configured to generate lift for the UAV when rotated in the second direction. The blades of the second directionality of propeller may have a reverse pitch of the blades of the first directionality of propeller. The propeller of the first directionality and a propeller of a second directionality may have the same diameter and/or blade shape. In some instances, the propeller of the first directionality and the propeller of the second directionality may be substantially identical except for the direction of the blade pitch.

In some embodiments, if a propeller directionality does not match the propeller seat directionality, the motor may be prevented from spinning to rotate the propeller. If a propeller directionality does not match a propeller seat directionality, none of the motors of the UAV may be allowed to spin to rotate any of the propellers until the proper directionality is matched. A UAV may be prevented from taking off until all of the propellers are properly locked onto the UAV, and all the propellers of the proper directionalities are attached to the corresponding propeller seats. This prevents the UAV from toppling or crashing upon takeoff. This prevents the propellers from falling off during flight, or causing the UAV to flip over in an unwanted manner. The directionality of the propellers may be detected prior to takeoff of the UAV. The directionality of the propellers may be detected prior to activation of motors of the UAV. The UAV may be capable of detecting directionality of the propellers without requiring activation of motors of the UAV.

Figure 7:
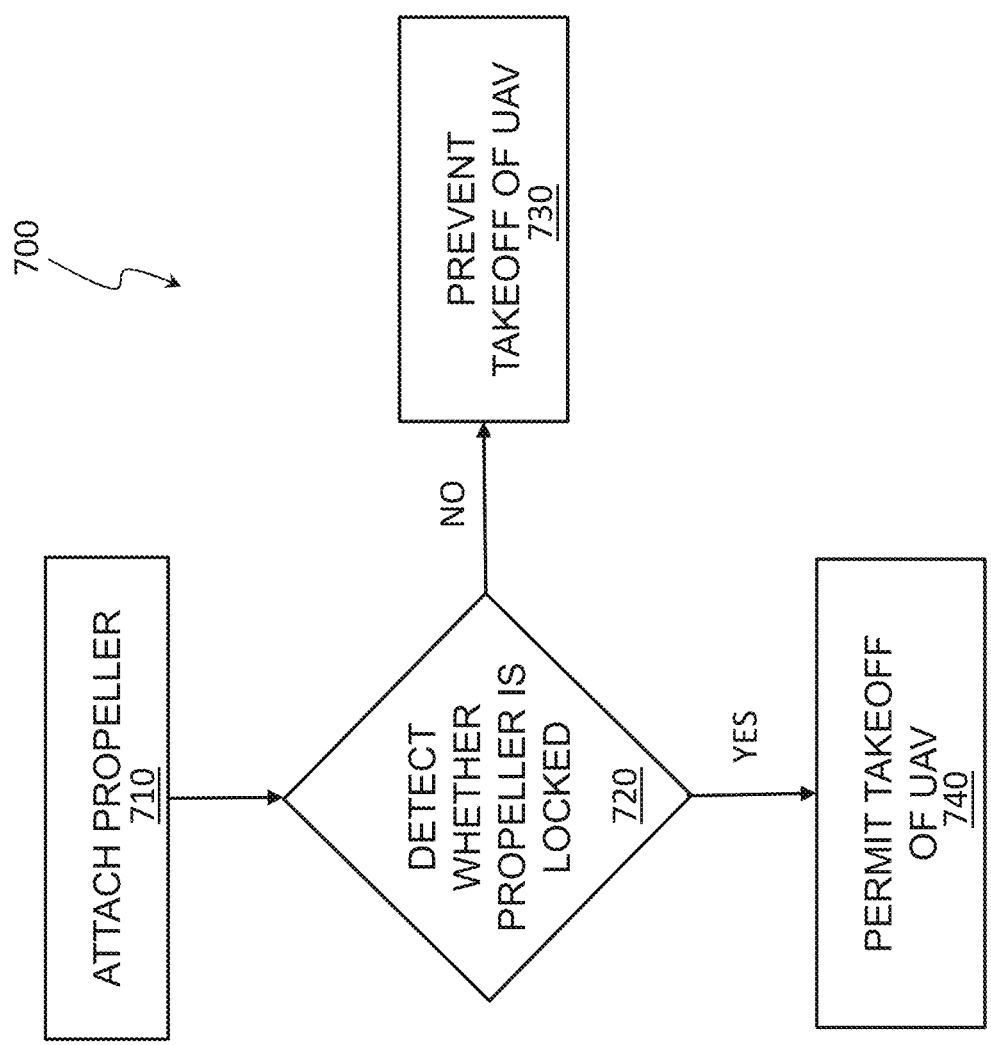
FIG. 7 shows an example of a process where a UAV does not take off when the propellers are not securely attached, in accordance with embodiments of the disclosure.

FIG. 7 shows an example of a process 700 for preventing a UAV from taking off when the propellers are not securely attached to the propeller seats, in accordance with embodiments of the disclosure. A propeller may be attached to the UAV at block 710. A determination may be made whether the propeller is locked at block 720. If the propeller is not locked, the UAV is not permitted to takeoff at block 730. If the propeller is locked, take off of the UAV is permitted at block 740.

A propeller may be attached to the UAV at block 710. A user may manually attach a propeller to the UAV. A user may manually attach a propeller to a propeller seat of the UAV. In some embodiments, a propeller may be attached to a propeller seat without being locked. For example, a propeller may be placed on a shaft or other member of the propeller seat. An additional action, such as depression and/or rotation may be required to lock the propeller to the propeller seat.

A detection may be made of whether the propeller is locked to the UAV 720. Such detection may include determining whether the propeller is attached and/or locked to a propeller seat of the UAV. The detection may be made prior to takeoff of the UAV. The detection may be made without requiring activation of any motors of the UAV. The detection may be made prior to any rotation by any of the motors of the UAV. The detection of whether a propeller is locked to a propeller seat may be made without requiring activation or rotation of a corresponding motor of the propeller seat. It may be useful to detect whether the UAV is locked to the propeller seat without activating the motors. Rotating propellers that are mis-installed and/or the airborne UAV with mis-installed propellers may cause injuries to people and/or damages to the UAV or other properties.

In some embodiments, the detection may be made with aid of one or more sensors. The sensor may be configured to collect external information that may be useful for determining whether the propeller is locked to the shaft and whether the propeller is not locked to the shaft or other component of the propeller seat. The propeller may be locked to the shaft or other component of the propeller seat when the propeller is attached in a manner that does not permit the propeller to come off during operation of the UAV. The sensor may be on-board the UAV or may be on-board the propeller.

The determination of whether the propeller is locked to the propeller seat may be made with aid of one or more processors. The sensor may provide a signal to the one or more processors. Based on the signal, the one or more processors may determine whether the propeller seat is locked to the propeller seat or is not locked to the propeller seat. The one or more processors may make the determination without requiring operation of one or more motors configured to effect rotation of the propeller.

In some embodiments, the one or more processors may determine when the propeller is locked based on a distance between the propeller and a propeller seat. For instance, the sensor on the propeller seat may be configured to detect the distance between a portion of the propeller and the sensor. In various embodiments, the distance may be measured based on magnetic fields, electromagnetic radiation, sound waves, and the like. For instance, one or more objects to be sensed (e.g., magnets) may be attached on the propeller (e.g., inside a hub of the propeller) and the sensor (e.g., Hall sensor) may be attached to propeller seat or elsewhere on the UAV. The sensor may be configured to provide a signal indicating a distance between the sensor and the object(s) to be sensed. In some cases, the objects to be sensed may be an integral part of the propeller itself (e.g., a surface of the propeller). As another example, the sensor may be a proximity sensor (e.g., infrared sensor, ultrasound sensor, laser sensor).

In some embodiments, the one or more processors may determine when the propeller is locked based on a contact between the propeller and a portion of the UAV. For instance, the one or more processors may determine when the propeller is locked based on a contact made between an electrical contact of the propeller and an electrical contact on-board the UAV (e.g., on the propeller seat). Such a contact may trigger certain measurable electrical signals which can be used to determine the status of the propeller installation. In another example, the one or more processors may determine when the propeller is locked based on output from a pressure sensor configured to measure a pressure experienced by the propeller and/or the propeller seat. A pressure measurement at or exceeding a certain threshold value may indicate locking. Conversely, a pressure measurement below a certain threshold value may indicate unlocking.

The one or more processors may determine when the propeller is locked based on data captured about the propeller position from a sensor remote to the propeller. In some instances, the sensor may be an ultrasonic sensor, an acoustic sensor, an optical sensor, an RFID detector, or any other type of sensor as described elsewhere herein. In one example, the one or more processors may determine when the propeller is locked based on an image captured of at least a portion of the propeller when the propeller is attached or locked to the propeller seat. The one or more processors may determine when the propeller is locked with aid of one or more visual markers on a surface of the propeller. In another example, the light sensed by a light sensor (on the propeller seat or on the propeller) may indicate the installation status of the propeller. For instance, various light intensities, ranges of light intensities or other characteristics may be associated with various configurations between the propeller and the propeller seat. Thus, a current configuration can be estimated by analyzing the characteristics of the output of the light sensor.

If the propellers are not locked, the UAV may be prevented from taking off at block 730. In some instances, a propeller may be not locked when the propeller is attached to the propeller seat but not securely locked into place. The propeller may be not locked when there is no propeller even attached to the propeller seat.

If the propellers are not locked, the motors of the UAV may be prevented from being activated. The motors of the UAV may not rotate, even if a user is providing an instruction for the motors to rotate, if the propellers are not locked. In some embodiments, if even a single propeller of the UAV is not locked, then none of the motors may be activated or allowed to rotate. If one or more propellers of the UAV are not locked, the corresponding motors for those propellers may not be activated or allowed to rotate. If one or more propellers of the UAV are not locked, none of the motors of the UAV may be permitted to rotate enough to cause the UAV to take off. The UAV may be prevented from taking off, even if the user is providing an input instructing the UAV to take off, or to increase rotation of the motors.

The user may optionally be provided with an alert that one or more of the propellers are not locked. The user may be informed that the UAV is not being permitted to take off because one or more of the propellers is not locked. The alert may be provided to a remote terminal that the user is using to control the UAV. In some instances, the alert may provide an indication of which propeller is not securely locked. For instance, the alert may provide an identifier for the arm or propeller seat for which the propeller is not securely locked. The alert may provide a graphical display of the UAV and a visual indication of which propeller is not securely locked. Alternatively or additionally, the user may be provided instructions for correcting the mis-installation.

In some embodiments, the determination of the installation status of the propellers may be performed during operation of the UAV (e.g., mid-flight). If mis-installation of one or more propellers is detected, an alert or warning may be provided to a remote user. Alternatively or additionally, the UAV may be configured to automatically descend and/or land to reduce the risk of continued use of the mis-installed propellers.

If the propellers are locked, the UAV may be permitted to take off at 740. In some embodiments, all of the propellers of the UAV may need to be locked for the UAV to be permitted to takeoff. All of the propellers may need to be securely fastened in a manner that will not allow the propellers to come off the UAV during flight of the UAV. The one or more processors may generate one or more instructions that cause rotation of the motor to permit takeoff of the UAV only when one or more, or all of the propellers are locked to the propeller seat (e.g., locked to the shaft or other component of the propeller seat).

In some embodiments, in parallel with or sequentially with determining whether the propellers are locked, the one or more processors may determine whether the propellers of the proper directionality are attached to the propeller seats.

In some embodiments, a propeller of a non-matching directionality may not be permitted to lock onto the propeller seat. In some embodiments, the propeller and/or propeller seat may be configured in a manner that prevents the propeller from locking if the propeller has a different directionality from the propeller seat. In some embodiments, determination of whether the propeller is locked to the propeller seat includes determination of whether the propeller is of a proper directionality, since only a propeller of a proper directionality may be permitted to lock into the propeller seat. In some instances, a separate determination may be made whether the propeller is of the proper directionality, even when the propeller is not locked into the propeller seat.

A propeller of non-matching directionality may be permitted to lock onto the propeller seat. A separate determination may be made whether the propeller is of the proper directionality for the propeller seat to which it is locked. This may be conducted sequentially with a determination of whether the propeller is locked. For example, first a determination may be made whether the propeller is locked. If the propeller is not locked, the motor may be prevented from being activated or rotated. If the propeller is locked a determination may be made whether the locked propeller is of a proper directionality. If the propeller is not of the proper directionality, then the motor may be prevented from being activated or rotated. If the propeller is of the proper directionality, the UAV may be permitted to take off.

In another example, first a determination may be made whether the propeller is of a proper directionality. If the propeller is not of the proper directionality, then the motor may be prevented from being activated or rotated. If the propeller is of a proper directionality, a determination may be made whether the propeller is locked. If the propeller is not locked, the motor may be prevented from being activated or rotated. If the propeller is locked, the UAV may be permitted to take off.

The determination may be made in parallel with respect to whether the propeller is locked and with respect to whether the directionality of the propeller and the propeller of the propeller seat match. If the propeller is not of the proper directionality, or is not locked, then the motor may be prevented from being activated or rotated. If the propeller is of the proper directionality and is locked, the UAV may be permitted to take off.

Alternatively or in addition, one or more processors may determine whether a propeller is attached and/or locked to a UAV based on operating conditions of the UAV. Operating conditions of the UAV may comprise data from one or more motors of the UAV. In some embodiments, rotation of the motors and/or propellers may occur in order to determine whether the propellers are attached and/or locked to the UAV. For example, power to the motor, power from the motor, energy consumption by the motor, speed of rotation of the motor, and/or other factors may be assessed to determine whether the propellers are attached and/or locked to the UAV.

Figure 8:
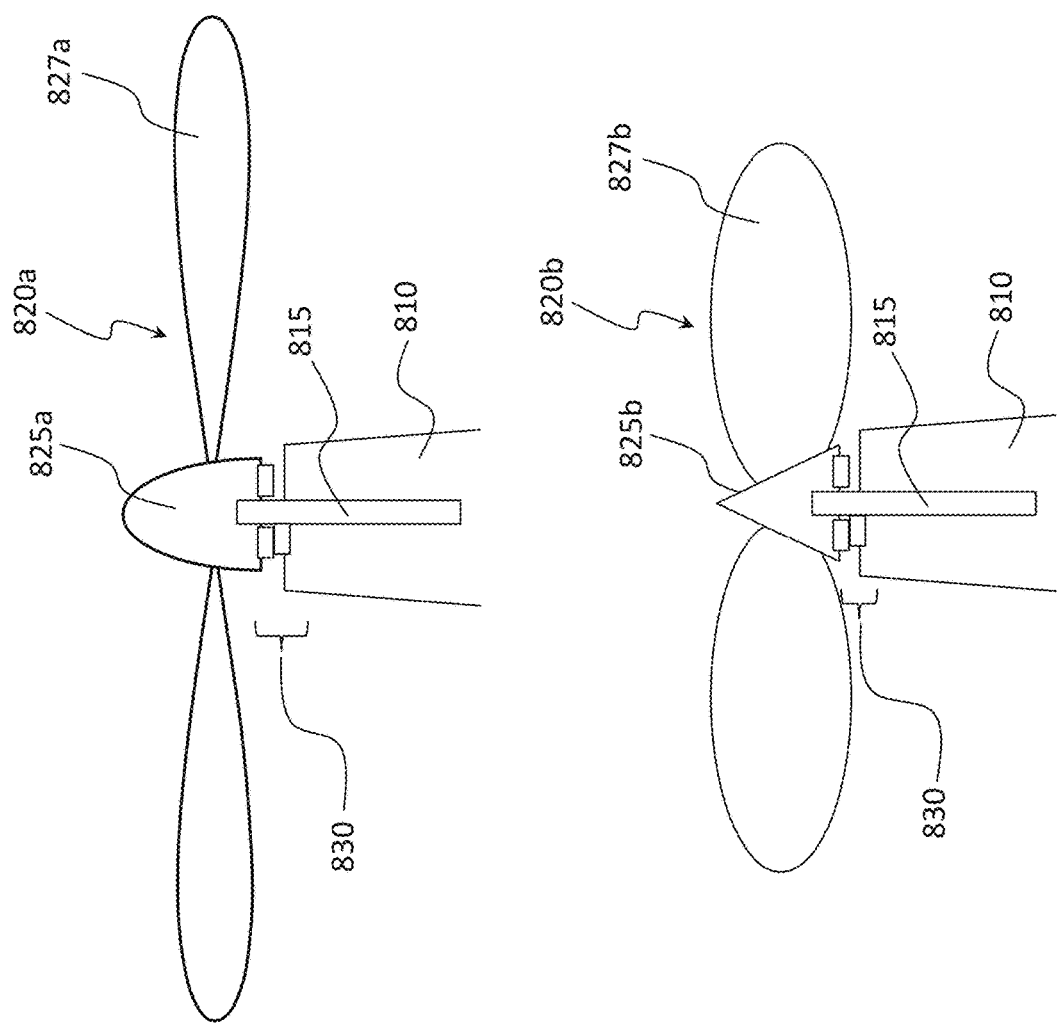
FIG. 8 shows an example of different types of propellers that may be attached to a propeller seat, in accordance with embodiments of the disclosure.

FIG. 8 shows an example of different types of propellers that may be attached to a propeller seat, in accordance with embodiments of the disclosure. In some embodiments, a propeller seat 810 may be configured to accept a propeller 820*a*, 820*b*. One or more coupling mechanisms may aid in connecting the propeller to the propeller seat. One or more sensing mechanisms 830 may detect the connection of the propeller to the propeller seat, and/or the type of propeller.

A propeller seat 810 may be configured to accept a propeller 820*a*, 820*b*. The propeller seat may comprise a shaft 815 or other component that may be configured to engage with the propeller. Any description herein of a propeller engaging with a shaft may apply to a propeller engaging with any other component of the propeller seat, such as an intermediary component, adapter, or locking mechanism. A shaft may be configured to rotate, which may result in rotation of the propeller. The shaft rotation may be driven by a motor.

The propeller seat 810 may be configured to accept a plurality of types of propellers 820*a*, 820*b*. Different types of propellers may have different characteristics. For example, different types of propellers may have different hub 825*a*, 825*b* and/or different blade 827*a*, 827*b* characteristics. For example, different hub characteristics may include different hub sizes, different hub shapes (lateral or vertical cross-section), different hub surfaces or finishes, different hub materials, different hub interiors (e.g., interior shape, interior surface features, adapters), and/or different hub directionalities. Different blade characteristics may include different blade sizes (e.g., length, width, thickness), different blade shapes (lateral or vertical cross-section, proportions, edges), different blade surfaces or finishes, different blade materials, blade pitch (directionality, or angle measurement), and/or number or arrangement of blades. In some embodiments, propellers of different types may be provided for the same propeller directionality. For example, a propeller of the first propeller type may be configured to rotate in a counterclockwise direction and a propeller of the second propeller type may also be configured to rotate in a counterclockwise direction. The propellers of various types may be provided in different directionalities. For example, a UAV may comprise a propeller of the first type with a first directionality and a propeller of the first type with a second directionality.

Different types of propellers may be designed for different types of operations or functionalities of the same UAV, different types of UAVs, and/or different types of environments. For example, some propeller types may be more suited for stable flight than others, which may be useful when a beginner user is operating the UAV. In another example, some propeller types may be more suited for high altitude flying, which may be useful when the UAV is engaging in activities that will result in high altitude flight. In another example, some propeller types may be less stable but may allow for greater maneuverability of the UAV which may be useful for trick flying or advanced users. In some embodiments, some propeller types may be less responsive but may be useful for energy-saving flight, or long-range flights. Some propellers may be built more robustly and may be suitable for harsher weather conditions than other propeller types. Some propeller types may provide certain desired visual effects that may be different from other propeller types (e.g., propellers with lights that spin with the propellers). Each of the propeller types may have at least one characteristic that is different from another propeller type. The propeller types may or may not be visually distinguishable from one another. In some embodiments, each of the propellers of various types may be configured to be attached to the same type of propeller seat. Thus, propellers of different types can be swapped in and out of the same propeller seat as desired.

In one example, a first propeller type may not be configured for use in at an altitude above a predetermined maximum threshold, while a second propeller type may be configured for use at an altitude above the predetermined maximum threshold. The predetermined maximum threshold may be any altitude, such as about 50 m, 100 m, 200 m, 300 m, 350 m, 400 m, 500 m, 600 m, 800 m, 1000 m, 1600 m, 2000 m, 2400 m, 2800 m, 3200 m, 4000 m, or 5000 m. The second propeller type may operate less efficiently than the first propeller type at an altitude beneath the predetermined threshold. Depending on the type of flying that the user anticipates for the UAV, the user may select the appropriate propeller type. When the user wishes to use the UAV for a different type of flying, the user may swap out the propeller type for another propeller type that is more suited for the newly anticipated type of flying.

A propeller may be attached to a propeller seat with aid of a coupling mechanism. One or more coupling mechanisms may aid in securing the propellers of various types to the propeller seat. The one or more coupling mechanisms may allow the various types of propellers to be locked onto the propeller seat. Even if the propellers of different types have different characteristics, they may have a coupling mechanism that may be configured to engage with a coupling mechanism of the propeller seat. The coupling mechanisms of the different propeller types may have the same characteristics, or may share at least some common characteristics that allow the propellers of the different types to be locked onto the same propeller seat.

The coupling mechanism may permit the propeller to be attached to the propeller seat. The coupling mechanism may or may not permit the propeller to be attached to the propeller seat without being locked to the propeller seat. The coupling mechanism may permit the propeller to be locked to the propeller seat. The propeller may be locked to the propeller seat when the propeller is secured to the propeller seat in a manner that prevents the propeller from coming off the propeller seat during operation of the UAV. The propeller may be locked to the propeller seat when it is secured to the propeller seat in a manner that permits the propeller to be detached from the propeller seat only through manual intervention of the user. The manual intervention of the user may be a deliberate action, such as a depression of a button, a flip of the switch, a depression and/or rotation, or other motion.

The coupling mechanism may comprise one or more portions on the propeller seat. The coupling mechanism may comprise one or more portions on the propeller. In some embodiments, the coupling mechanism may comprise portions on the propeller seat and the propeller. The coupling mechanism may permit the portions on the propeller seat and the propeller to engage with one another to provide attachment and/or locking of the propeller to the propeller seat.

One or more sensing mechanisms 830 may detect the connection of the propeller to the propeller seat, and/or the type of propeller. The one or more sensing mechanisms may be integrated as part of the one or more coupling mechanisms or may be separate from the one or more coupling mechanisms. The sensing mechanisms may comprise one or more sensors. The one or more sensors may be provided on the propeller seat, the propeller, or both the propeller seat and the propeller. Optionally, an object to be sensed may be provided as part of a sensing mechanism. The object to be sensed may be provided on the propeller seat, the propeller, or both the propeller seat and the propeller. In some embodiments, a sensor on a propeller seat may be configured to sense the object to be sensed on the propeller. A sensor on a propeller may be configured to sense the object to be sensed on the propeller seat.

The one or more sensing mechanisms may or may not come into direct physical contact with one another. The one or more sensing mechanisms may or may not require direct physical contact between a portion of the propeller and a portion of the propeller seat.

In some embodiments, propeller or propeller seat sensors described herein may be used to identify different types of propellers attached to a given propeller seat, and/or the type of propeller seat to which a given propeller is attached to. Then, it may be determined whether the propeller matches the propeller seat. Additionally or alternatively, the correct predetermined locking configuration between the propeller and the propeller seat may be determined based on the propeller type and/or the propeller seat type. A configuration between the propeller and the propeller seat comprises a spatial configuration or spatial relationship between the propeller and the propeller seat. The current coupling configuration between the propeller and the propeller seat (as determined by the sensors) may be compared with the correct predetermined locking configuration to determine whether the propeller and the propeller seat are locked correctly, or locked at all.

The sensing mechanisms may detect when the propeller is attached and/or locked to the propeller seat. The sensing mechanisms may be configured to detect the type of propeller attached and/or locked to the propeller seat. The sensing mechanism may be able to distinguish between different types of propellers that may be attached and/or locked to the propeller seat. The sensing mechanism may identify the type of propeller attached and/or locked to the propeller seat. The sensing mechanism may or may not be able to detect the different characteristics of the propeller type attached and/or locked to the propeller seat. The sensing mechanism may or may not be able to distinguish the individual characteristics of the propeller types from one another.

In some embodiments, the sensor may be provided on the propeller seat and an object to be sensed may be provided on the propeller type. There may be variations to the object to be sensed based on the propeller type. For instance, propellers of the same propeller types may have the same characteristics of the object to be sensed. Propellers of different propeller types may have one or more different characteristics of the object to be sensed. For example, there may be different visual characteristics to the object to be sensed, for different propeller types. In another example, there may be different electrical resistance or capacitance values for the object to be sensed, for different propeller types. In another example, there may be different placement or dimensions to the object to be sensed, for different propeller types. There may be different data stored or RFID tags provided, for different propeller types.

In some embodiments, the sensing mechanisms may detect the configuration of propeller attached and/or locked to the propeller seat. The sensing mechanism may be able to distinguish between different configurations of propellers that may be attached and/or locked to the propeller seat. The sensing mechanism may identify the configuration of propeller attached and/or locked to the propeller seat. A configuration of propeller may include the propeller type and/or directionality of the propeller. For example, the sensing mechanism may be able to detect different propeller types and/or propeller directionalities.

In some embodiments, depending on the propeller type that is detected, the UAV may execute different types of flight control commands. For instance, one or more processors of the UAV may determine the type of propeller that is attached. The processors may determine the type of propeller attached based on information from one or more sensing mechanisms. The one or more processors may determine whether a propeller attached to a propeller seat (e.g., shaft or other component) is of a first propeller type or a different second propeller type. The one or more processors may generate one or more instructions for controlling the actuators (e.g., motors) for the propellers so as to control flight of the UAV. In some embodiments, a first set of instructions may be generated when the propeller attached to the propeller seat is of the first propeller type and a second set of instructions may be generated when the propeller attached to the propeller seat is of the second propeller type. The various sets of instructions may indicate various rotation speeds for the motors under various conditions that may differ from one another for different sets of instructions. In other embodiments, instructions may be generated when the propeller attached to the propeller seat is of the first propeller type and no instructions may be generated when the propeller attached to the propeller seat is of the second propeller type.

Generating different sets of flight instructions depending on the propeller types may enable the UAV to accommodate the different characteristics of the different propeller types. The different sets of flight instructions may also allow the UAV to operate in different flight modes for different types of flight, that are suited to the propeller types that are attached. The different sets of flight instructions for the different propeller types may be different from one another. In one example, a first set of instructions may improve performance of the UAV over a second set of instructions when the first propeller type is used by the UAV, and a second set of instructions may improve performance of the UAV over a first set of instructions when the second propeller type is used by the UAV. Improved performance may include increased energy efficiency, improved responsiveness, or greater achievement of the type of flight for which the selected propeller type is designed.

The different sets of flight instructions may control the speed of rotation of the motors in different manners. The different sets of flight instructions may or may not control the direction of rotation of motors in different manners. The different sets of flight instructions may control the rotation of the motors in response to a user flight control input. For example, if a user is manually controlling flight of the UAV, based on a user input (e.g., joystick movement, touchscreen control, tilt of the controller, voice command, etc.), different sets of flight instructions may be generated for different propeller types. Similarly, if a UAV is operating semi-autonomously or autonomously, different sets of flight instructions may be generated for the UAV depending on the propeller type.

In some embodiments, the processors may generate flight instructions based on both the propeller type information and other sensing information. Such other sensing information may include sensing data from other sensors carried by the UAV, or sensing data from sensors located off board the UAV. Such onboard/offboard sensors any of the sensors described herein such as location sensors, image sensors, proximity sensors, inertial sensors, and the like.

Figure 9:
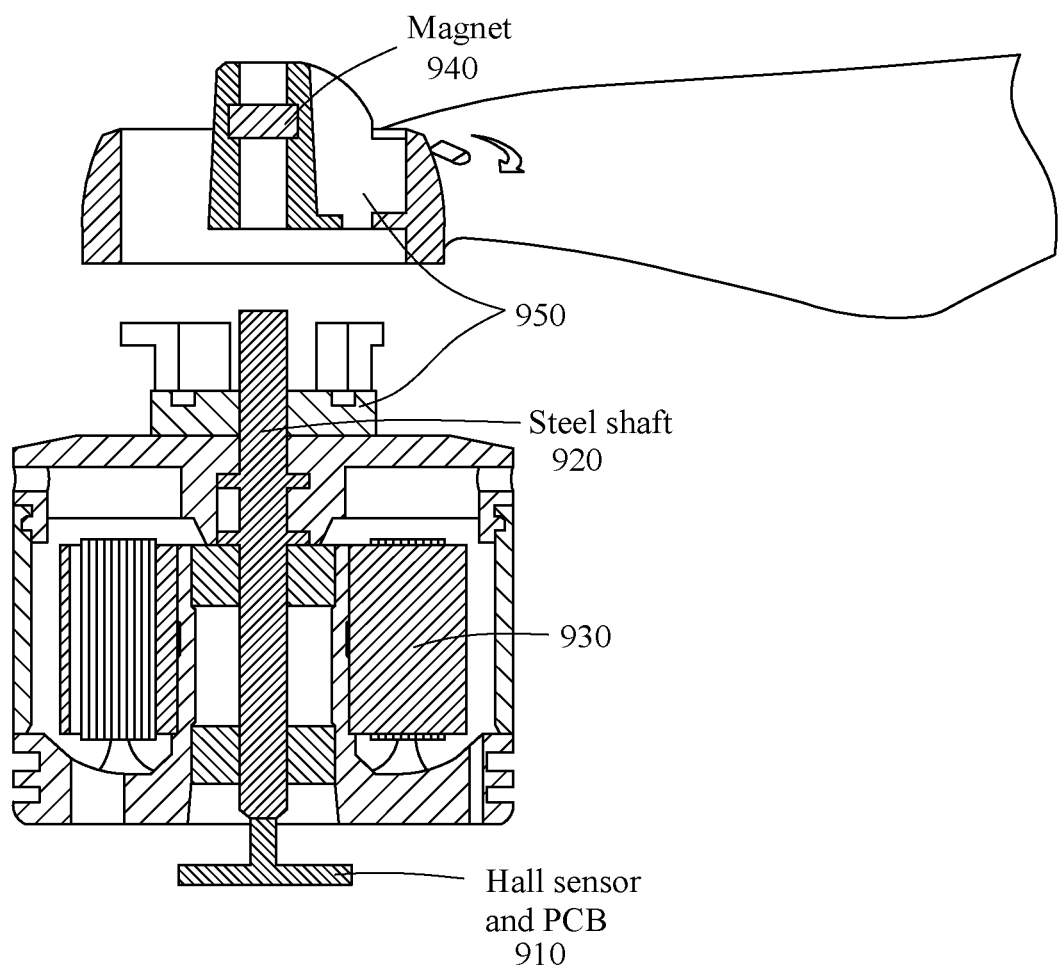
FIG. 9 shows an example of a propeller detection mechanism utilizing a Hall sensor, in accordance with embodiments of the disclosure.

FIG. 9 shows an example of a propeller detection mechanism utilizing a Hall sensor, in accordance with embodiments of the disclosure. As previously described, the UAV and/or propeller may comprise one or more sensing mechanisms that may be useful for detecting the attachment of the propeller, locking of the propeller, propeller directionality, and/or propeller type.

A sensing mechanism may comprise a Hall sensor 910. The Hall sensor (also referred to as the Hall effect sensor) may comprise a transducer that varies its output voltage in response to a magnetic field. The Hall sensor may comprise an associated printed circuit board (PCB). The Hall sensor may be provided on-board the UAV. The Hall sensor may be provided within, on, or near a propeller seat. The Hall sensor may comprise an analog transducer that may directly return a voltage. For a known magnetic field, a distance of the magnet from the Hall sensor may be determined. Any description herein of a Hall sensor may apply to any type of sensor that may be capable of detecting a magnetic field.

The Hall sensor 910 may be operably coupled to a shaft 920. The Hall sensor may be located at or near the shaft. In some embodiments, the Hall sensor may be located beneath the shaft. The Hall sensor may or may not directly contact the shaft. The Hall sensor may or may not directly contact an end of the shaft or a side of the shaft. The shaft may be formed from a ferromagnetic material, a magnetic conductive material, a paramagnetic material, or a diamagnetic material. For example, the shaft may be formed from steel. The shaft may be formed from a ferrous metal. In some embodiments, the shaft may be formed from iron, permalloy, or mu-metal. The shaft may be formed from a material with a magnetic permeability of at least $1 \times 10^{-4}$ H/m, $1 \times 10^{-3}$ H/m, $1 \times 10^{-2}$ H/m, or $1 \times 10^{-1}$ H/m.

Rotation of the shaft may be driven with aid of one or more motors 930. The motor may control directionality and/or speed of the rotation of the shaft. The motor may be configured to rotate the shaft in a clockwise direction or in a counterclockwise direction.

The Hall sensor 910 may be configured to sense the magnetic field of a magnet 940. The magnet may be provided on the propeller. When the propeller is separated from the UAV, the magnet may be on the propeller and not on the UAV. The magnet may be provided within a shaft hole of the propeller. The magnet may be provided within or on a hub of the propeller. Alternatively, the magnet may be provided on or in a blade of the propeller. The magnet may be located above the shaft when the propeller is attached to the shaft. In some embodiments, the magnet may be provided above the shaft and the Hall sensor may be provided beneath the shaft, when the propeller is attached to the shaft. The magnet may or may not come into direct contact with the shaft when the propeller is attached to the shaft. The magnet may or may not come into direct contact with the shaft when the propeller is locked to the shaft. The magnet may be at or near the top end of the shaft. The magnet may contact the shaft at a top end, or a side of the shaft.

The magnet 940 can be configured to generate a magnetic field. The magnet can include a permanent magnet or an electromagnet. The permanent magnet can include magnetic metallic elements, composites (e.g., ceramic magnet, alnico magnet, injection-molded magnet, flexible magnet), rare-earth elements, and the like. The magnet can also include a coil of wire (a solenoid) that is configured to generate a magnetic field when electric current passes through it. In various embodiments, the solenoid can be wrapped around a ferromagnetic material or a non-ferromagnetic material. In some embodiments, the electric current for the electromagnet may be provide by a source that is located on the same object where the magnet is located (e.g., the propeller). In another embodiment, the electric current for the electromagnet may be provide by a source that is located on a different object.

In some embodiments, the Hall sensor can be configured to detect a magnetic field produced by the shaft 920. In some embodiments, the shaft can be made of a ferromagnetic material that can be magnetized by the magnet 940. For example, the shaft can be made of a "soft" ferromagnetic material (e.g., annealed iron) or a hard ferromagnetic material (e.g., alnico or ferrite). The magnetized shaft can produce a magnetic field, the strength and/or the direction of which may vary depending the properties of the magnet, the properties of the shaft, and/or a distance between the magnet and the shaft. The characteristics of the magnetic field produced by the shaft, as measured by the Hall sensor, can be used to determine the spatial configuration between the magnet and the shaft and/or between the magnet and the sensor. The spatial configuration can include a distance between the propeller and the propeller seat and/or a relative orientation therebetween. For example, the distance can be measured from the magnet to a Hall sensor of the propeller seat. As another example, the relative orientation can include a relative rotation between the propeller and the propeller seat with respect to a rotation axis (e.g., the shaft). The distance and/or orientation thus determined can then be used to estimate a type of the propeller and/or the configuration between the propeller and the propeller seat (e.g., locked or unlocked).

In some embodiments, the relative distance and/or orientation can be compared with one or more predefined threshold values and the type of the propeller and/or the configuration between the propeller and the propeller seat can be determined based on the comparison. In an example, when the distance is equal to or less than a threshold distance value, the propeller may be determined to be locked to the propeller seat. In another example, when the distance is between two predetermined threshold values, the propeller may be determined to be locked to the propeller seat. In general, any discussion herein with respect to the detecting and using the magnetic field of the magnet applies in a similar manner to detecting and using the magnetic field of magnetized shaft.

A connection mechanism 950 may be provided. The connection mechanism may utilize one or more features on-board the UAV and/or one or more features on-board the propeller. The connection mechanism may permit the propeller to be attached to the UAV. The connection mechanism may permit the propeller to lock to the UAV.

The distance between the magnet and the Hall sensor may vary, depending on the position of the propeller relative to the propeller seat. The varying distance may cause different magnitude and/or direction of the magnetic field to be detected by the Hall sensor. The distance between the magnet and the Hall sensor may be furthest when the propeller is not even attached to the UAV. When the propeller is not attached to the UAV the Hall sensor may not detect the presence of the magnet, or the magnetic field from the magnet may be very weak. A distance between the magnet and the Hall sensor may or may not be calculated when the propeller is not attached to the UAV. One or more processors may or may not calculate the distance between magnet and the Hall sensor when the propeller is not attached. In some embodiments, as the propeller approaches the shaft and is closer to getting attached, the distance may start being calculated.

It is understood that in various embodiments, the Hall sensor discussed herein can be replaced by other magnetometers capable of measuring aspects of a magnetic field such as its strength and/or direction, without deviating from the scope of the present disclosure. Any discussion with respect to the Hall sensor also applies to other types of magnetometer. Examples of such magnetometers can include, without limitation, vector magnetometers (e.g., Hall effect magnetometer, rotating coil magnetometer, magnetoresistive device, fluxgate magnetometer, SQUID magnetometer, spin-exchange relaxation-free (SERF) atomic magnetometer) or scalar magnetometers (e.g., proton precession magnetometer, overhauser effect magnetometer, caesium vapour magnetometer, potassium vapour magnetometer).

Figure 10:
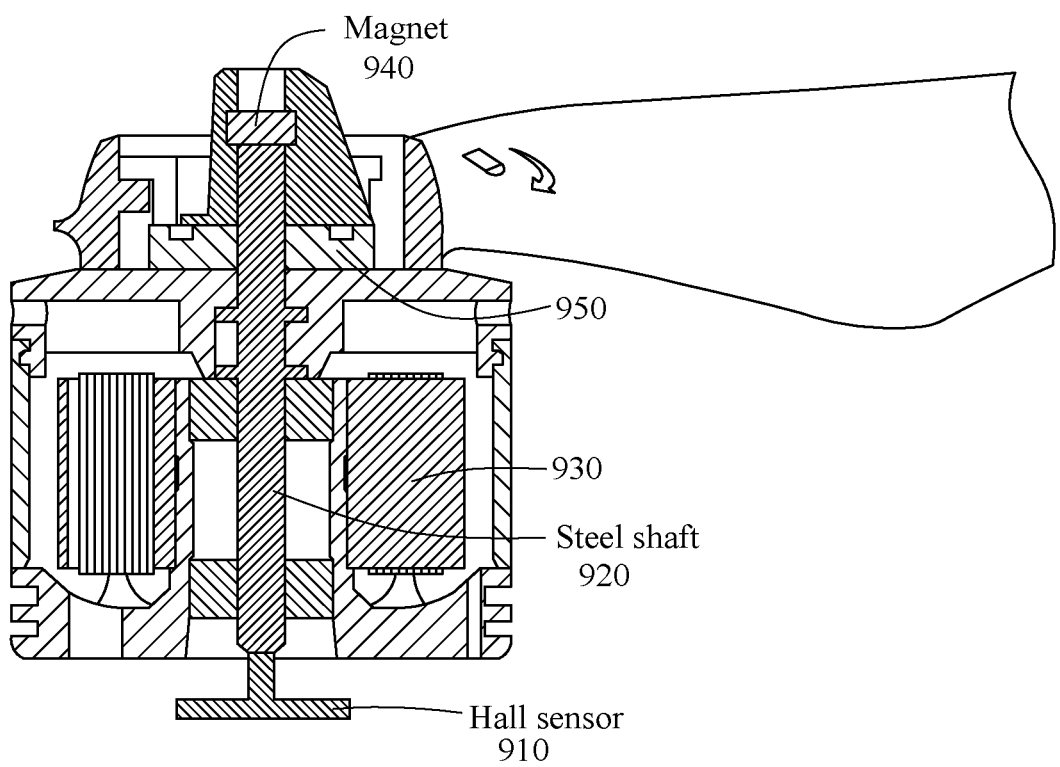
FIG. 10 shows an example of detecting when the propeller is attached but not secured with aid of a Hall sensor, in accordance with embodiments of the disclosure.

FIG. 10 shows an example of detecting when the propeller is attached but not secured with aid of a Hall sensor, in accordance with embodiments of the disclosure. When the propeller is attached to the UAV but not secured, the magnet 940 may or may not come into direct contact with the shaft 920. In some embodiments, when the propeller is attached but not locked to the UAV, the distance between the magnet and the Hall sensor may be the least distance. The distance between the magnet and the Hall sensor may optionally be about the length of the shaft.

One or more processors may calculate the distance between the magnet and the Hall sensor. The one or more processors may calculate the distance based on measurements of a magnetic field provided by the Hall sensor (e.g., strength and/or direction of the magnetic field). The magnetic field can be caused by the magnet in a direct or indirect fashion. For example, the magnetic field can be generated directly by the magnet. Alternatively, the magnetic field can be generated by a shaft that is magnetized by the magnet. In another example, the magnetic field can be a combination of the magnetic field generated by the magnet and the magnetic field generated by the shaft. The magnetic field may be generated by the magnet, the shaft, or the both. The one or more processors may calculate the distance based on known properties of the magnet and/or the Hall sensor. The one or more processors may calculate the distance based on known properties of the shaft. The one or more processors may be able to determine when the propeller is attached but not locked to the UAV. In some embodiments, if the distance between the magnet and the Hall sensor falls within a predetermined threshold, the one or more processors may determine that the propeller is attached but not locked to the UAV.

Figure 11:
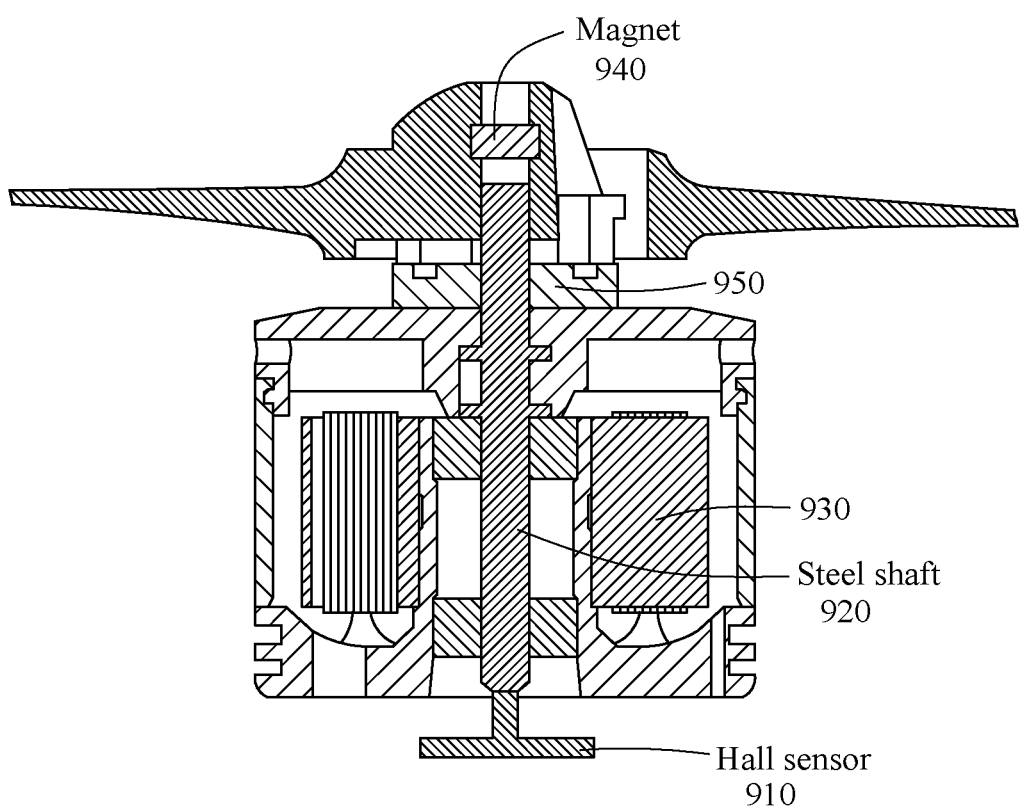
FIG. 11 shows an example of detecting when the propeller is secured to a propeller seat with aid of a Hall sensor, in accordance with embodiments of the disclosure.

FIG. 11 shows an example of detecting when the propeller is secured to a propeller seat with aid of a Hall sensor, in accordance with embodiments of the disclosure. When the propeller is locked to the UAV, the distance between the magnet 940 and the Hall sensor 950 may be equal to or greater than when the propeller is on the shaft but is not locked. Alternatively, the distance between the magnet 940 and the Hall sensor 950 may be equal to or less than when the propeller is on the shaft but is not locked. The distance between the magnet and the Hall sensor may be greater than a length of the shaft 920. In some embodiments, the magnet may not come into direct contact with the shaft when the propeller is locked to the UAV. In some instances, a gap may be provided between the magnet and the shaft when the propeller is locked to the UAV.

One or more processors may be configured to calculate the distance between the magnet and the Hall sensor. The one or more processors may be configured to calculate the distance based on a measurement by the Hall sensor, known properties of the magnet, known properties of the Hall sensor, and/or known properties of the shaft. The one or more processors may be configured to determine when the propeller is locked to the UAV based on the calculated distance between the magnet and the Hall sensor. In some embodiments, if the distance between the magnet and the Hall sensor falls within a predetermined range, the one or more processors may determine that the propeller is locked to the UAV. In some embodiments, the predetermined range may have a minimum value greater than or equal to a distance at which the propeller would be attached to the UAV but not locked. The predetermined range may have a maximum value where the propeller may be locked to the UAV.

In some embodiments, the distance between the magnet and the Hall sensor may depend on the connection mechanism 950 utilized to connect the propeller to the UAV. In some embodiments, the connection mechanism may be configured to cause the propeller to be positioned lower down relative to the propeller seat (shorter distance between the propeller and the propeller seat) when the propeller is attached but not locked, and may be configured to cause the propeller to be positioned higher up relative to the propeller seat (longer distance between the propeller and the propeller seat) when the propeller is locked to the propeller seat. For example, the connection mechanism may push the propeller at least partially upwards and away from the propeller seat when the propeller is locked to the propeller seat, via a ramp, spring, tension component, or other similar components. In alternative embodiments, the relative distance between the propeller and the propeller seat may be greater when they are attached but not locked, than when they are locked. In some embodiments, the propeller may be rotated to lock the propeller into the propeller seat. When rotated, the distance between the magnet and the Hall sensor may change. Such a change in distance may be detected by the Hall sensor and used to determine the configuration between the propeller and the propeller seat.

In some embodiments, the distance between a Hall sensor and a magnet may be used to assess the state of the propeller relative to the UAV. For instance, the distance between the Hall sensor and the magnet may be used to assess whether the propeller is attached to the UAV or not attached to the UAV. The distance between the Hall sensor and the magnet may be used to assess whether the propeller is locked to the UAV or not locked to the UAV. In some instances, the change in distance between a Hall sensor and a magnet may be used to assess the state of the propeller relative to the UAV. The distance between the Hall sensor and the magnet over time may be used to assess the state of the propeller relative to the UAV.

In some instances, the distance between a Hall sensor and a magnet may be used to assess the propeller configuration. For instance, the propellers of different types may have different characteristics, such as locations, placements, dimensions, polarities, or strengths of magnet. In some embodiments, for a first type of propeller, the magnet may have a different characteristic than for a second type of propeller. In some instances, the different characteristics may result in different distances between the Hall sensor and the magnet when the propeller is locked into the place. The Hall sensor may be configured to detect the strength and/or direction of the magnetic field, and one or more processors may determine the distances. Based on the distances, the one or more processors may identify the type of propeller attached to a propeller seat. In some instances, the Hall sensors may be configured to detect the magnetic field, and the one or more processors may differentiate different characteristics of the magnet. Based on the different characteristics of the magnet, the one or more processors may identify the propeller type attached and/or locked to a propeller seat. Based on the identified propeller type, various sets of instructions may be generated that may affect rotation of the propellers.

The magnet can include permanent magnet or electromagnet. In one example where the magnet is an electromagnet, the electromagnetic frequency of the magnet on-board the propeller may be configured to differ based on the type of propeller. A magnet of a first electromagnetic frequency may be provided for a first propeller type and a magnet of a second electromagnetic frequency may be provided for a second propeller type. A sensor, such as the Hall sensor, may be configured to detect the electromagnetic frequency of the magnet. The one or more processors may determine that the propeller attached to a shaft has a first configuration or second configuration based on the electromagnetic frequency.

In some examples, the direction and/or strength of the magnetic field detected by the Hall sensor may be used to determine an orientation of the magnet (e.g., relative to the shaft and/or to the Hall sensor). The orientation of the magnet may be used to determine a type of the propeller. For example, a first propeller may have a magnet disposed thereon with the magnet's North (N) pole closer to the shaft and its South (S) pole farther from the shaft. A second propeller may have the opposite configuration. That is, a magnet that is disposed on the second propeller may have its South pole closer to the shaft and its North pole farther from the shaft. When the propellers are attached to the propeller seat, different magnetic fields (e.g., with different strength and/or direction) may be detected by the Hall sensor, and the difference can be used to differentiate the different types of propellers. For example, the first propeller may have a certain directionality (e.g., clockwise) and the second propeller may have an opposite directionality (e.g., counter-clockwise). Similarly, in some embodiments, the orientation of the magnet can be determined indirectly based on the characteristics of the magnetic field of the shaft, which is magnetized by the magnet.

In another example, a first configuration of propeller may comprise a magnet with a first polarity and the second configuration of propeller may comprise a magnet with a second polarity different from the first polarity. A sensor, such as the Hall sensor, may be configured to detect the polarity of the magnet on-board the propeller. The one or more processors may determine that the propeller attached to the first shaft has the first configuration of propeller when the magnet has the first polarity and the second configuration of propeller when the magnet has the second polarity. The different polarities of the magnets may be caused by different orientation of the magnets (e.g., North pole toward or away from the shaft), different shapes and/or dimensions of the magnets (e.g., bar shape or spherical shape), different materials of the magnet, and the like.

In some embodiments, the magnet may have a selected polarity. Magnets of different polarities may be provided for propellers of different directionalities or other different characteristics of propellers. For instance, a propeller configured to rotate in a first direction to generate lift may have a first polarity while a propeller configured to rotate in a second direction to generate lift may have a second polarity. The first direction and second directions may be different. The first polarity and the second polarity may be different. For example, a propeller configured to rotate in a clockwise direction to generate lift may have a polarity of N while a propeller configured to rotate in a counterclockwise direction to generate lift may have a polarity of N, or vice versa. The Hall sensor may detect the polarity of the magnet. The one or more processors may determine the directionality of the propeller based on the detected polarity of the magnet by the Hall sensor. For instance, the one or more processors may determine that a propeller attached to a shaft has a first directionality of propeller when the magnet has a first polarity and a second directionality of propeller when a magnet has a second polarity. The one or more processors may determine whether the correct directionality of propeller is attached to the respective propeller seats.

Figure 12:
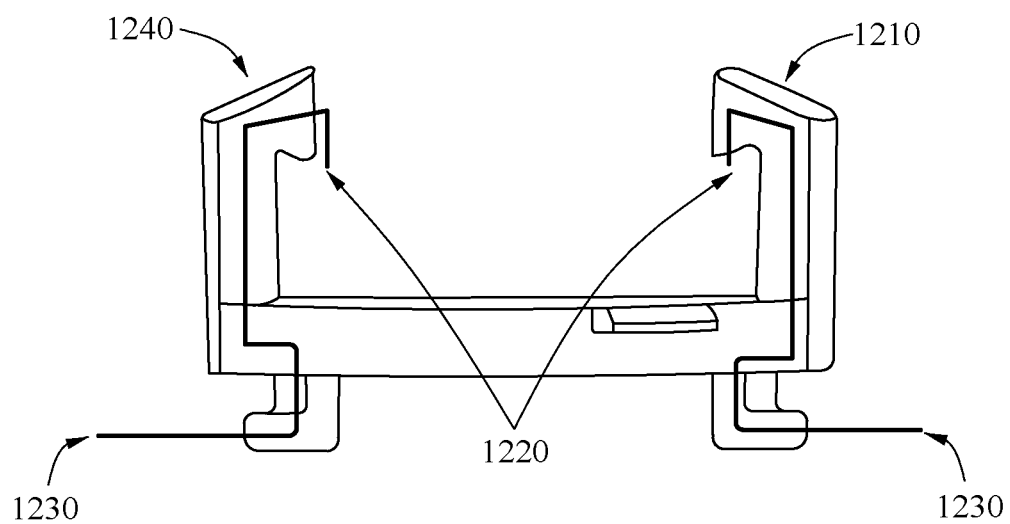
FIG. 12 shows an example of a propeller detection mechanism utilizing electrical contacts, in accordance with embodiments of the disclosure.

FIG. 12 shows an example of a propeller detection mechanism utilizing electrical contacts, in accordance with embodiments of the disclosure. A connection mechanism 1210 may be configured to receive a propeller. The connection mechanism may be on-board the UAV. The connection mechanism may form at least a portion of a propeller seat. The connection mechanism may allow the propeller to attach to the UAV. The connection mechanism may allow the propeller to lock to the UAV.

The connection mechanism may comprise one or more electrical contacts 1220. The one or more electrical contacts may be configured to contact one or more corresponding electrical contacts of the propeller. The one or more electrical contacts may or may not be configured to come into contact with the corresponding contacts of the propeller when the propeller is attached to the UAV but not locked. In some embodiments, one or more electrical contacts may or may not be configured to come into contact with the corresponding contacts of the propeller when the propeller is locked to the UAV. In some embodiments, one or more electrical contacts may be configured to come into contact with contacts of the propeller when the propeller is attached but not locked to the UAV and one or more other electrical contacts may be configured to come into contact with the contacts of the propeller when the propeller is locked to the UAV. While two electrical contacts are illustrated, in various embodiments, more than two electrical contacts may be provided.

In some embodiments, the electrical contacts of the propeller may be electrically connected, e.g., via an electrical conduit disposed inside the propeller hub. When contact is made between one or more electrical contacts of the connection mechanism and the one or more electrical contacts of the propeller, an electrical loop may be formed. An electrical circuit may be completed which may allow electricity to flow. In some embodiments, the contacts coming into contact with one another may trigger a switch, which may allow electricity to flow. Based on the flow of the electricity, the attachment and/or locking of the propeller to the UAV may be detected. Based on the flow of electricity, one or more processors may make the determination that the propeller is attached and/or locked onto the UAV. In some embodiments, multiple electrical loops and/or switches may be provided for each stage. For instance, the one or more processors may determine when the propeller is attached to the UAV prior to locking the propeller to the UAV, and may determine when the propeller is then locked to the UAV.

In some embodiments, the electrical contacts may be electrically connected to one or more electrical conduit 1230. The electrical conduits may be connected to a motor, a controller, a switch, or other devices. The electrical conduit may be any form of material that may allow electricity to pass through. For instance, the electrical conduit may be a wire, cable, braided connection, bar, and/or bus. The electrical contacts and/or electrical conduit may be formed of a material with low electrical resistivity. In some embodiments, the electrical contacts and/or electrical conduit may be formed of a metal or metal alloy such as, but not limited to, copper, brass, silver, aluminum, steel, gold, graphene, tungsten, zinc, nickel, lithium, iron, platinum, tin, or any alloys or combinations thereof.

In some embodiments, the connection mechanism may comprise one or more features 1240, such as hooks, protrusions, bars, bumps, or surfaces, that are configured to come into contact with the propeller. The one or more electrical contacts 1220 may be provided on one or more of the features. The one or more electrical contacts may or may not protrude from a surface of the connection mechanism. The one or more electrical contacts may provide a sufficiently large surface area to ensure good contact with the corresponding contacts of the propeller. In some embodiments, the electrical contacts may have an exposed area of at least 1 cm2, 0.5 cm2, 0.3 cm2, 0.1 cm2, 7 mm2, 5 mm2, 3 mm2, 2 mm2, 1 mm2, 0.5 mm2, 0.1 mm2, 0.05 mm2, or 0.01 mm2. In some embodiments, the electrical contacts may be formed as a plate, bar, mesh, circle, bump, or any other configuration.

Figure 13:
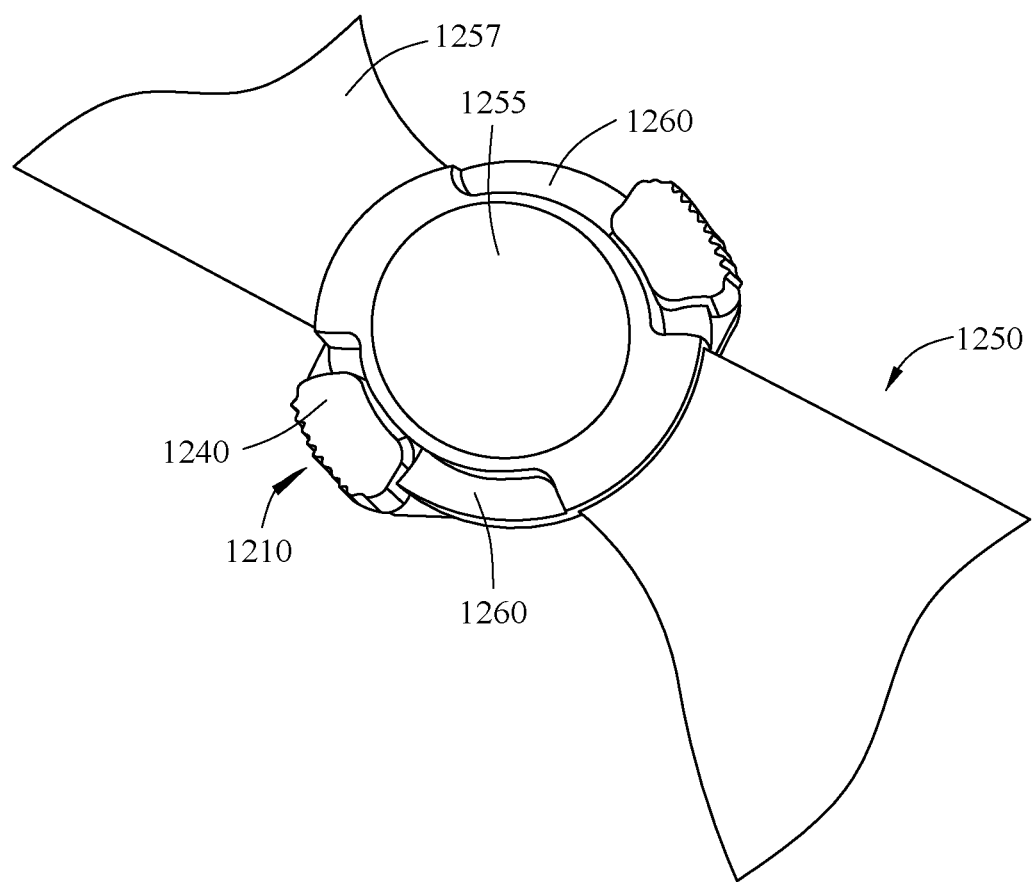
FIG. 13 shows an additional view of a propeller detection mechanism utilizing electrical contacts, in accordance with embodiments of the disclosure.

FIG. 13 shows an additional view of a propeller detection mechanism utilizing electrical contacts, in accordance with embodiments of the disclosure. A connection mechanism 1210 may be configured to come into contact with a propeller 1250. The connection mechanism may allow a propeller to attach to a UAV. The connection mechanism may allow the propeller to be locked to the UAV.

The connection mechanism may comprise one or more features 1240. The one or more features may aid with the attachment and/or locking of the propeller. The one or more features may comprise one or more protrusions or overhangs. In some embodiments, when a propeller is attached but not locked to the UAV, the one or more features may not be engaged with the propeller. In some embodiments, gaps may be provided between the features. A propeller may be attached to the connection mechanism by inserting a portion of the propeller through the gaps between the features.

The propeller 1250 may comprise a hub 1255 and one or more blades. The one or more blades may extend from the hub. The hub may comprise a connecting feature 1260. The connecting feature of the hub may be configured as a protrusion, ramp, slide, bump, or other feature. The connecting feature and/or blades of the propeller may be configured to fit in the gap between the one or more features 1240 of the connection mechanism when attached to the UAV but not locked.

In some embodiments, the electrical contacts of the connection mechanism 1210 may be provided on the one or more features 1240 of the connection mechanism. The one or more electrical contacts may be provided on a surface of the one or more features. In some embodiments, the one or more electrical contacts may be on a side, or underside of the features.

The propeller 1250 may comprise a hub 1255 which may comprise one or more connecting features 1260. In some instances, a pair of connecting features may be provided. The electrical contacts of the propeller may be provided on the one or more connecting features of the hub. In some instances, the electrical contacts of the propeller may be on a top surface or side surface of the one or more connecting features of the hub, or another portion of the hub. The electrical contacts of the propeller may be electrically connected via a wire disposed at least in part inside the hub.

The one or more electrical contacts of the connection mechanism may be configured to not contact electrical contacts of the propeller when the propeller is attached but not locked to the UAV, as illustrated. In other instances, one or more of the electrical contacts of the connection mechanism may be configured to contact one or more electrical contacts of the propeller when the propeller is attached but not locked to the UAV.

In some embodiments, as illustrated, when the propeller is attached to the UAV but not locked to the UAV, the electrical contacts on one or more features of the connection mechanism may not contact the electrical contacts on the connecting features of the propeller. The electrical contacts on the connection mechanism may be exposed. The electrical contacts on the connecting features of the propeller may be exposed, as illustrated.

Figure 14:
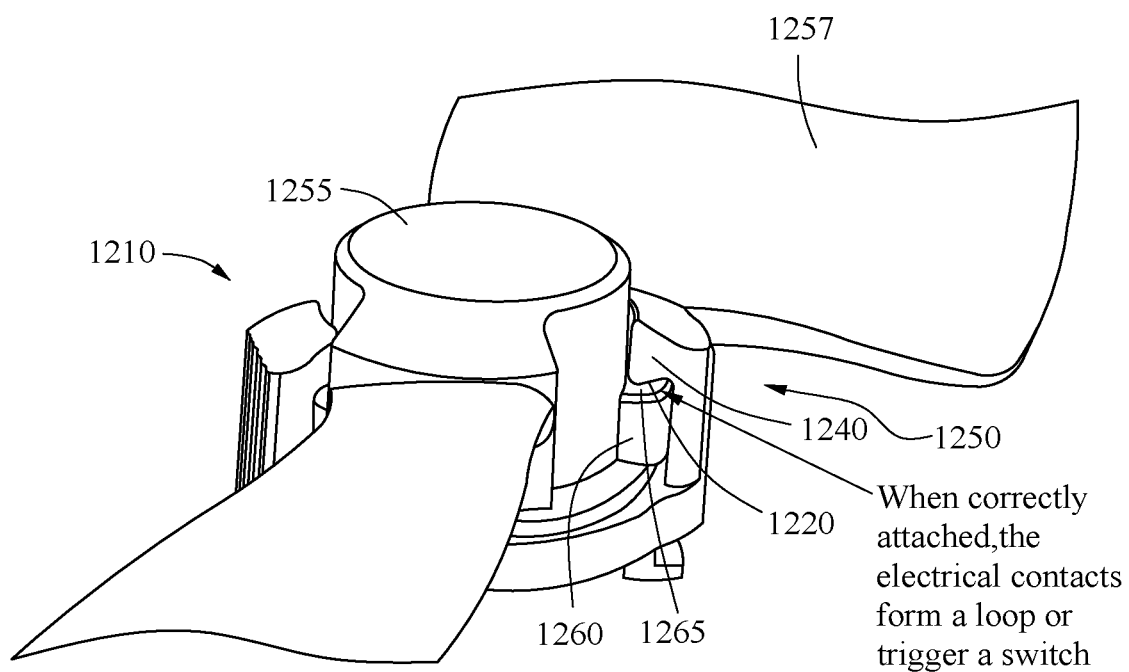
FIG. 14 shows a further view of a propeller detection mechanism utilizing electrical contacts, in accordance with embodiments of the disclosure.

FIG. 14 shows an additional view of a propeller detection mechanism utilizing electrical contacts, in accordance with embodiments of the disclosure. The propeller 1250 may be locked to a UAV with aid of a connection mechanism 1210. The propeller may comprise a hub 1255 and one or more blades 1257. The propeller may comprise a connection feature 1260 which may have one or more electrical contacts 1265 thereon.

The connection mechanism may comprise one or more features 1240 that may aid in the connection of the propeller to the UAV. The features may comprise one or more electrical contacts 1220 thereon.

When the propeller is locked to the UAV using the connection mechanism, the electrical contacts 1265 of the propeller may come into contact with the electrical contacts of the connection mechanism 1220. In some embodiments, the electrical contacts of the connection mechanism may be on an underside of a protruding and overhanging feature 1240. The electrical contacts of the propeller may be on a top side of the connection feature 1260 of the propeller. Locking the propeller may include twisting the propeller such that the connection features 1260 and the connection features 1240 engage with each other. An engagement plane or surface may be substantially perpendicular to the shaft axis (e.g., a top surface of the propeller connection features 1260 contacting with a bottom surface of the connection features 1240). Alternatively or additionally, an engagement plane or surface may be substantially parallel to the shaft axis (e.g., a side surface of the propeller connection features 1260 contacting with a side surface of the connection features 1240).

In some embodiments, there may be variations to the configurations of the propeller and the connection mechanism that may affect the placement of the electrical contacts and how they come into contact with one another. For example, the connection mechanism may comprise a feature with the electrical contacts on a side or the top of the feature. The propeller may comprise one or more connection features and the electrical contacts may be on a side of the connection features or a bottom side of the connection features. The electrical contacts from the propeller and the connection mechanism may contact one another through a side contact. Alternatively or in addition, the electrical contacts from the propeller and/or connection mechanism may contact one another through a top-bottom contact. In some embodiments, a connection mechanism may comprise one or more of electrical contacts and/or corresponding features. Optionally, a propeller may comprise one or more electrical contacts and/or corresponding connection features.

In some embodiments, the electrical connection between the contacts may be made only when the propeller is locked to the UAV. Thus, detection of the electrical connection may indicate that the propeller is attached to the UAV. Optionally, a first electrical connection may be made between a first set of contacts when the propeller is attached to the UAV but not locked, and a second electrical connection may be made between a second set of contacts when the propeller is locked to the UAV. Thus, detection of the first electrical connection may indicate that the propeller is attached but not locked to the UAV, and detection of the second electrical connection may indicate that the propeller is locked to the UAV. The first electrical connection may or may not be maintained when the second electrical connection is made.

Any description herein of contact that may be made between an electrical contact on a propeller and an electrical contact on a connection mechanism may also apply to the triggering of a switch. For instance, a switch may be provided on the connection mechanism and/or the propeller. When the propeller is attached but not locked to the UAV a switch may or may not be triggered. When the propeller is locked to the UAV a switch may be triggered. In some embodiments, a first switch may be triggered when the propeller is attached but not locked to the UAV. A second switch may be triggered when the propeller is locked to the UAV. Triggering of the switch may complete an electric circuit.

The electric circuit may be completed when the propeller is locked to the UAV. The electric circuit may or may not be completed when the propeller is attached but not locked to the UAV. In some embodiments, a first electric circuit may be completed when the propeller is attached to the UAV, and a second electric circuit may be completed when the propeller is locked to the UAV. The completion of the circuit may occur by contact between the electrical contacts, or the triggering of the switch, as described.

In some embodiments, the sensor as described may be an electrical contact, or a sensor that may measure the electrical flow through the completed circuit. The sensor may be an electrical contact of the connection mechanism. An electrical contact of the propeller may come into contact with the sensor on-board the UAV when the propeller is locked, and does not come into contact with the sensor when the propeller is not locked. The sensor may be a switch. The switch may be triggered when the propeller is locked and not triggered when the propeller is not locked.

In some embodiments, measurements of various aspects of the electrical circuit may be used to assess the state of the propeller relative to the UAV. For instance, the presence or absence of electric current (also referred to as electrical flow) in the electric circuit may be used to determine whether a propeller is attached to the UAV or not attached to the UAV. Electric current may be present when the propeller is attached to the UAV and may be absent when the propeller is not attached to the UAV. The presence or absence of electric current may be used to assess whether the propeller is locked to the UAV or not locked to the UAV. The electric current may be present when the propeller is locked to the UAV and may be absent when the propeller is not locked to the UAV. The electric current may be present when an electrical circuit is completed (e.g., by the electrical contacts coming together, and/or the triggering of a switch) and absent when the electrical circuit is not completed (e.g., when the electrical contacts do not come into contact with one another, and/or a switch is not triggered).

In various embodiments, amplitude, direction, phases, frequency, and/or other characteristics of various attributes associated with the electrical circuit can be measured and used to assess the propeller configuration. Examples of electrical attributes can include electric current, electric resistance, voltage, capacitance, electromagnetic field, piezoelectric effect, and the like. In some embodiments, one or more resistors and/or capacitors may be disposed between and electrically connected to a pair of propeller electrical contacts. When the propeller electric contacts are connected to the corresponding electrical contacts of the propeller seat, measurements can be made by one or more devices electrically connected to the propeller seat electrical contacts. The measurements can be used to differentiate different types of propellers.

In an example, for a first type of propeller, a resistor on-board the propeller may have a different resistance level than resistor on-board a second type of propeller (e.g., disposed between a pair of propeller electrical contacts). In another example, for a first type of propeller, a capacitor on-board the propeller may have a different capacitance level than a capacitor on-board a second type of propeller. In some embodiments, a propeller may have a sponge or other contact surface of a different level of hardness for a first type of propeller, than a second type of propeller. The different hardness of sponge may trigger a piezoelectric sensor on-board the UAV to a different amount. For instance, the different hardness of sponge may deflect a piezoelectric sensor by a different amount. Based on the various types of measurements that may be made (e.g., different resistance measurements, capacitance measurement, and/or hardness measurements), the one or more processors may identify the type of propeller attached to a propeller seat. In some instances, the UAV may comprise one or more sensors that may be able to measure the different properties of a portion of the propeller (e.g., measure the different resistance levels of a resistor, measure the different capacitance levels of a capacitor, and/or use a piezoelectric sensor to measure the different hardness levels of a sponge or other component of the propeller). Based on the different properties of the propeller, the one or more processors may identify the propeller type attached and/or locked to a propeller seat. Based on the identified propeller type, various sets of instructions may be generated that may affect rotation of the propellers.

In some embodiments, a portion of the propeller may have different properties (e.g., different electrical resistance, capacitance, and/or hardness). Portions with different properties may be provided for propellers of different directionalities. For instance, a propeller configured to rotate in a first direction to generate lift may have a portion with a first property (e.g., first level of electrical resistance, first level of capacitance, first level of hardness) while a propeller configured to rotate in a second direction to generate lift may have a second property (e.g., second level of electrical resistance, second level of capacitance, second level of hardness). The first direction and second directions may be different. The first property and the second property may be different.

For example, a propeller configured to rotate in a clockwise direction to generate lift may have a resistor with a first resistance level while a propeller configured to rotate in a counterclockwise direction to generate lift may have a resistor with a second resistance level. When a circuit is completed and electrical flow may occur (e.g., when the propeller is attached and/or locked to the UAV), a sensor on-board the UAV may measure the resistance level. The one or more processors may determine the directionality of the propeller based on the detected resistance level by the sensor. For instance, the one or more processors may determine that a propeller attached to a shaft has a first directionality of propeller when the resistor has a first resistance level and a second directionality of propeller when a resistor has a second resistance level. The one or more processors may determine whether the correct directionality of propeller is attached to the respective propeller seats.

In another example, a propeller configured to rotate in a clockwise direction to generate lift may have a capacitor with a first capacitance level while a propeller configured to rotate in a counterclockwise direction to generate lift may have a capacitor with a second capacitance level. When a circuit is completed and electrical flow may occur (e.g., when the propeller is attached and/or locked to the UAV), a sensor on-board the UAV may measure the capacitance level. The one or more processors may determine the directionality of the propeller based on the detected capacitance level by the sensor. For instance, the one or more processors may determine that a propeller attached to a shaft has a first directionality of propeller when the capacitor has a first capacitance level and a second directionality of propeller when a capacitor has a second capacitance level. The one or more processors may determine whether the correct directionality of propeller is attached to the respective propeller seats.

Furthermore, a propeller configured to rotate in a clockwise direction to generate lift may have a sponge with a first level of hardness while a propeller configured to rotate in a counterclockwise direction to generate lift may have a sponge with a second level of hardness. When a propeller is attached and/or locked to the UAV, a piezoelectric sensor on-board the UAV may measure the level of hardness based on a degree of deflection by the piezoelectric sensor. The sponge may come into contact with the piezoelectric sensor. When the hardness level is greater, the piezoelectric sensor may be deflected more than when the sponge has a lesser hardness level. Any description herein of a piezoelectric sensor may also apply to any type of pressure sensor that may be contacted or depressed by the sponge. The one or more processors may determine the directionality of the propeller based on the detected hardness level by the sensor. For instance, the one or more processors may determine that a propeller attached to a shaft has a first directionality of propeller when the sponge has a first hardness level and a second directionality of propeller when a sponge has a second hardness level. The one or more processors may determine whether the correct directionality of propeller is attached to the respective propeller seats.

Any description herein of the sensor on-board the UAV may apply to a sensor on-board the propeller. The sensor on-board the propeller may generate information which may be communicated to the UAV. The information may be communicated to the UAV wirelessly or through a wired connection with the UAV. The information may be communicated via a communication conduit that may be formed when the propeller is attached and/or locked to the UAV. A sensor on-board the UAV may be powered by a power source on-board the UAV. A sensor on-board a propeller may be powered by a power source locally on-board the propeller. A sensor on-board a propeller may be powered by a power source on-board the UAV, which may provide power to the sensor when the propeller is attached to the UAV and/or locked to the UAV.

In some embodiments, a sensor remote to the propeller may be used to detect when the propeller is attached and/or locked to the UAV. The sensor may be on-board the UAV. The sensor may determine when the propeller is attached and/or locked to a shaft of a propeller seat, or any other component of the propeller seat. The sensor may detect the presence and/or absence of the propeller. The sensor may detect the placement and/or positioning of the propeller. The sensor may detect the placement and/or positioning of the propeller relative to the propeller seat or any component thereof (e.g., shaft, connection mechanism, etc.). The sensor may detect a component of the propeller.

The sensor may be an ultrasonic sensor, an optical sensor (e.g., camera), lidar, signal detector (e.g., RFID detector), or any other type of sensor, as described elsewhere herein. The sensor may or may not emit signals that may be reflected, absorbed, or diffracted by the propeller. The sensor may emit signals and may measure signals that bounce back from the propeller. Alternatively, the sensor may not need to emit signals, but may measure signals that are provided from the propeller. These may include ultrasonic signals, electromagnetic signals (e.g., light, IR, UV), radio signals, audio signals, or any other type of signals.

Any description herein of an ultrasonic sensor may apply to any type or acoustic sensor or proximity sensor. In some instances, an acoustic sensor can be used to measure a vertical displacement of a propeller. The acoustic sensor can be used to detect a sound or vibration of a motor to determine whether a propeller is attached and/or locked.

In some embodiments, a sensor may comprise a potentiometer. A potentiometer may be used to determine if a propeller is attached and/or locked. A potentiometer can detect vertical movement and/or rotational movement of the propeller. One or more processors may determine whether the propeller is attached and/or locked based on the vertical movement and/or the rotational movement of the propeller.

Figure 15:
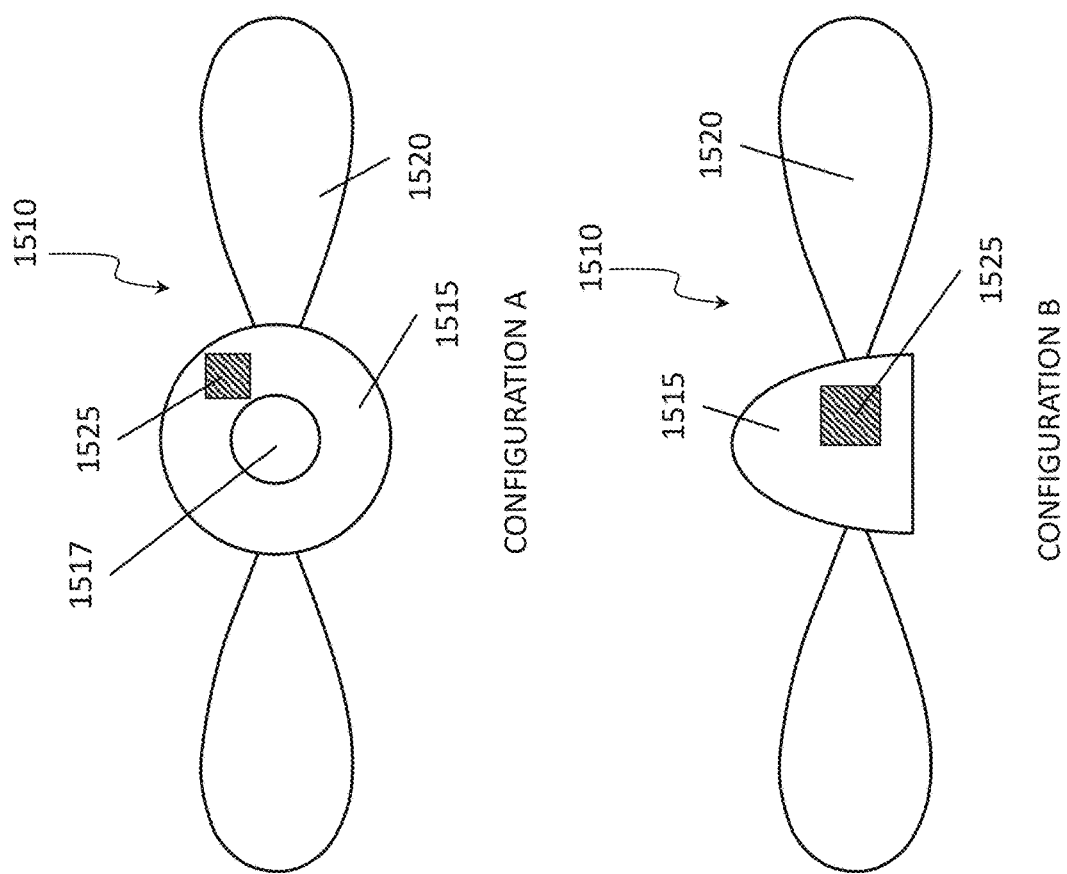
FIG. 15 shows an example of a marker that may be employed in a visual detection mechanism, in accordance with embodiments of the disclosure.

FIG. 15 shows an example of a marker that may be employed in a visual detection mechanism, in accordance with embodiments of the disclosure. In one example, a sensor may be a camera, scanner, reader, or other type of vision-based sensor that may be capable of visually detecting the propeller and/or a marker on-board the propeller. Any description herein of a camera may apply to any other type of visual detection sensor and/or electromagnetic detection sensor, and vice versa.

A propeller 1510 may comprise a hub 1515 and one or more blades 1520. A hub may or may not comprise an interior cavity 1517 that may be configured to accept a shaft or other portion of a propeller seat. A propeller may have any configuration as described elsewhere herein.

The propeller may comprise a marker 1525 thereon. The marker may be provided on any portion of the propeller. The marker may be provided on a hub of the propeller and/or one or more blades of the propeller. The marker may be provided on an exterior surface of the propeller. The marker may be provided on an interior surface of a propeller, such as a surface of a cavity within the propeller. The marker may be embedded into the propeller. The marker may be provided on a bottom surface of the propeller (e.g., hub, blade) as illustrated in a bottom view of the propeller in Configuration A. The marker may be provided on a side surface of the propeller (e.g., hub, blade) as illustrated in a side view of the propeller in Configuration B. The marker may be provided on a top surface of the propeller. The marker may be provided at a predetermined location (e.g., position, orientation) of the propeller. The marker may be provided at a predetermined location relative to one or more features of the propeller so that it may be determined whether the propeller is locked to the UAV or not, based on the detection of the marker. In some embodiments, a single marker may be provided on the propeller. Alternatively, more than one markers may be provided to facilitate more flexible or accurate detection. Any number or placement of markers may be provided that may allow a sensor to detect at least one of the markers when the propeller is attached and/or locked to the UAV. When multiple markers are provided, they may or may not have the same characteristics as one another. For instance, the markers may have different characteristics so as to indicate different positions on the propeller.

The marker may have any configuration that may be detectable by one or more optical sensors onboard the UAV (e.g., on the propeller seat). In some embodiments, the optical sensors may be positioned such that they can only detect the markers when the propeller and the propeller seat are disposed in a certain configuration, e.g., when the propeller is locked onto the propeller seat. For instance, an optical sensor may be disposed near a locking feature of the propeller seat and a marker may be disposed on a corresponding locking feature of the propeller. The marker may be detected by the optical sensor when the locking feature of the propeller and the locking feature of the propeller seat come into close proximity of each other such as when they are locked. In another embodiment, the propeller may have more than one markers at various positions, and the optical sensor on the propeller seat may be configured to detect different markers in different propeller/propeller seat configurations. For example, a first marker may be detected when the propeller is attached but not locked onto the propeller seat, while a second marker may be detected when the propeller is locked onto the propeller seat.

In some embodiments, the optical sensor may be configured to detect a direction, a dimension, a shape, a color, a pattern, and/or other characteristics of a marker. For example, different types of propellers may use markers of different characteristics. For instance, propellers with different directionalities may be disposed on the propeller with different directions, or they may have different shapes, sizes, colors or patterns. The one or more processors can be configured to determine the type of a given propeller based on the characteristics of the detected marker.

The marker may comprise a visual marking. The visual marker may comprise a barcode (e.g., 1D, 2D, 3D barcode), QR code, one or more letters, one or more numbers, one or more symbols, one or more icons, one or more pictures, and/or one or more geometric shapes. The visual marker may be formed from a single color or multiple colors. The visual marker may or may not comprise emitting elements such as lights (e.g., flashing in a pattern), fluorescent dyes, heat, or other emitting elements.

The sensor may be configured to detect the presence or absence of the marker. The sensor may be able to detect the relative positioning of marker. In some instances, the marker may only be in range of the sensor when the propeller is attached and/or locked to the propeller. In some instances, the marker may show up within a predetermined portion of a field of view of the sensor when the propeller is attached and/or locked to the UAV. If the marker does not show up in the predetermined portion of the field of view of the sensor, it may be determined that the propeller is not attached and/or locked to the UAV. The marker may show up with a predetermined orientation when the propeller is locked and/or locked to the UAV. If the marker does not show up in the predetermined orientation, it may be determined that the propeller is not attached and/or locked to the UAV. The marker may show up with a predetermined size within a field of view of the sensor when the propeller is attached and/or locked to the UAV. When the marker is not at the predetermined size within the field of view of the sensor, it may be determined that the propeller is not attached and/or locked to the UAV.

In some embodiments, the marker may be indicative of a propeller configuration. For instance, for propellers of different types, different markers may be provided. For propellers of the same configuration, the same marker may be provided. For instance, for propellers of the same type, the same marker may be provided. For propellers of different directionalities, different markers may be provided. For propellers of the same directionality, the same markers may or may not be provided. For example, if the propellers are of the same directionality and the same type, the same markers may be provided. If the propellers are of the same directionality and different type, different markers may be provided. In some instances, the marker may provide a portion indicative of directionality. The marker may provide a portion indicative of propeller type. The marker may or may not provide a portion indicative of an identity of the individual propeller (e.g., each propeller made may or may not have its own unique identity).

In some embodiments, profile information associated with various types of propellers may be stored onboard the UAV. In some cases, the profile information may be provided from a remote source (e.g., remote controller or remote server). The profile information may include various attributes associated with different types of propellers. The attributes may be associated with the physical characteristics of the propeller, such as its directionality, size, blade pitch, and/or visual characteristics. The attributes may include attributes associated with one or more detectable objects carried by the propeller such as a magnet, a resistor, a capacitor, or a visual marker. For example, the attributes can include magnetic information (e.g., strength and/or direction of a magnetic field associated with a propeller), distance information (e.g., distance from a magnet disposed inside the propeller to a bottom of the propeller), electric information (e.g., resistance or capacitance), visual information (e.g., visual marker information), and the like.

The profile information associated with various types of propellers can be accessed by the one or more processors onboard the UAV to determine the type of propeller that is attached or locked to the UAV. The one or more processors can be configured to obtain sensor data (also referred to as sensing data) with respect to a given propeller from one or more sensors (e.g., Hall sensor or an optical sensor) and determine the type of the propeller and other propeller profile information based on the sensor data and the stored profile information. For instance, visual marker information may be compared with visual marker information of various propellers to select the matching propeller.

One or more processors may determine when the propeller is attached and/or locked to the UAV (e.g., shaft of the UAV) based on an image captured of at least a portion of the propeller when the propeller is attached to the shaft. One or more processors may determine a propeller configuration (e.g., propeller type and/or propeller directionality) based on an image captured of at least a portion of the propeller when the propeller is attached to the shaft. The one or more processors may determine when the propeller is locked with aid of one or more visual markers on a surface of the propeller. The visual markers may show up in the image captured of the at least portion of the propeller, and may be used to determine whether the propeller is locked and/or attached to the UAV. The visual markers may show up in the image captured of the at least portion of the propeller, and may be used to determine a propeller configuration (e.g., propeller type and/or propeller directionality).

In some embodiments, the image captured of the portion of the propeller need not have a marker, in order to determine whether the propeller is attached and/or locked to the shaft, or the propeller configuration (e.g., propeller type or directionality). The image of the propeller (or at least a portion of the propeller) may be analyzed to recognize the propeller type and/or directionality. For instance, propeller size, shape, blade pitch, and other visual characteristics of the propeller may be analyzed to determine the propeller configuration. The image of the propeller (or at least a portion of the propeller) may be analyzed to determine relative placement of the propeller. The positioning of the propeller relative to the UAV (e.g., propeller seat) may be used to determine whether the propeller is attached and/or locked to the UAV. In some instances, the positioning of the propeller relative to a connection mechanism may be analyzed. The arrangement of the connection mechanism and portions exposed may be analyzed to determine whether the propeller is attached and/or locked. Distances between particular portions of the propeller and/or propeller seat may be measured and/or analyzed to determine information about the propeller and/or propeller positioning.

In some embodiments, any type of visual sensor (or optical sensor) may be used to determine whether a propeller is attached and/or locked to a propeller seat. A visual sensor can be used to measure a distance that can be used to measure vertical displacement of a propeller, which may be useful for determining whether the propeller is attached and/or locked to the propeller seat. In another example, a light can be cut off if the propeller is correctly attached and/or locked to the propeller seat. In another example, an optical path can be formed only if the propeller is attached and/or locked to the propeller seat. Depending on a visual indicator (e.g., marker, light, etc.) that may or may not be visible, a determination may be made whether the propeller is attached and/or locked to the propeller seat.

FIG. 16 shows an example of a radiofrequency identification (RFID) tag that may be used to aid in detection, in accordance with embodiments of the disclosure. In one example, a sensor may be a RFID reader, or other type of detection sensor that may be capable of wirelessly detecting the propeller and/or a RFID tag on-board the propeller. Any description herein of a RFID reader may apply to any other type of wireless detection sensor, and vice versa. Any description herein of an RFID tag may apply to any other type of wireless tag that may be capable of emitting information. The wireless tag may emit information along any frequency, such as a radio frequency or any other type of frequency.

A propeller 1610 may comprise a hub 1615 and one or more blades 1620. A hub may or may not comprise an interior cavity that may be configured to accept a shaft or other portion of a propeller seat. A propeller may have any configuration as described elsewhere herein.

The propeller may comprise a tag 1625, such as an RFID tag thereon. The tag may be provided on any portion of the propeller. The tag may be provided on a hub of the propeller and/or one or more blades of the propeller. The tag may be provided on an exterior surface of the propeller. The tag may be provided on an interior surface of a propeller, such as a surface of a cavity within the propeller. The tag may be embedded into the propeller. The tag may be provided on a bottom surface of the propeller (e.g., hub, blade). The tag may be provided on a side surface of the propeller (e.g., hub, blade). The tag may be provided on a top surface of the propeller. The tag may be provided at a predetermined location (e.g., position, orientation) of the propeller. The tag may be provided at a set location relative to one or more features of the propeller so that it may be determined whether the propeller is locked to the UAV or not, based on the position of the tag. In some embodiments, a single tag may be provided on the propeller. Alternatively, a pair of tags, or more may be provided on the surface of the propeller. Any number or placement of tags may be provided that may allow a sensor to detect at least one of the tags when the propeller is attached and/or locked to the UAV. When multiple tags are provided, they may or may not have the same characteristics as one another.

The tag may be detectable by a reader. For instance, the tag may be an RFID tag detectable by an RFID reader. The tag may be a wireless tag capable of emitting a signal that may be detectable by a corresponding wireless reader. The tag may be an electronic tag. The tag may comprise information about the propeller. For example, the tag may comprise information about a propeller type and/or propeller direction. The tag may comprise any information about any characteristic of the propeller, such as propeller size, blade shape, pitch, direction, materials, or any other characteristics, such as those described elsewhere herein. The tag may include information about a model of the propeller. The tag may include information about an identity of the propeller. The propeller may or may not have a unique identity.

The sensor may be able to read information from the tag. For instance, the sensor may read information about the propeller identifier, propeller characteristics, propeller type and/or propeller direction. The sensor may be configured to detect the presence or absence of the tag. The sensor may be able to detect the relative positioning of tag. In some instances, the tag may only be in range of the sensor when the propeller is attached and/or locked to the propeller. The sensor may be a proximity sensor. The sensor may have an independent power and/or signal transmission capability. A combination of the sensor capable of differentiating different propeller types and/or directionality and a sensor measuring proximity (e.g., proximity sensor and RFID reader) can be used. Such a combination of sensors can be used to detect attachment and/or locking of a propeller, and/or propeller type and/or directionality.

In some embodiments, the tag may be indicative of a propeller configuration. For instance, for propellers of different types, different information may be provided by the tag. For propellers of the same configuration, the same information may be provided by the tag. For instance, for propellers of the same type, the tag may convey the same information for propeller type. For propellers of different directionalities, different information about directionality may be provided by the tag. For propellers of the same directionality, the same information about directionality may be provided by the tag. For example, if the propellers are of the same directionality and the same type, the same information may be provided by the tags. If the propellers are of the same directionality and different type, the tags may provide the same information about directionality and different information about type. In some instances, the tag may provide information indicative of directionality. The tag may provide information indicative of propeller type. The tag may or may not provide a portion indicative of an identity of the individual propeller (e.g., each propeller made may or may not have its own unique identity).

One or more processors may determine when the propeller is attached and/or locked to the UAV (e.g., shaft of the UAV) based on information captured of the tag of the propeller when the propeller is attached to the shaft. In some instances, the attachment and/or locking status may be detected using any other technique described elsewhere herein. Information from the tag may be used in combination with the information from other techniques to determine whether the propeller is attached and/or locked. In other instances, information from the tag may be used to determine propeller directionality and/or type without being used to determine whether the propeller is attached and/or locked. One or more processors may determine a propeller configuration (e.g., propeller type and/or propeller directionality) based on information from a tag of a propeller when the propeller is attached to the shaft. For instance, one or more processors may determine whether the propeller is of a first propeller type or second propeller type based on the tag of the propeller. The one or more processors may determine whether the propeller is of a first directionality or a second directionality based on the tag of the propeller. The one or more processors may determine when the propeller is locked based on the information from the tag or using other techniques.

System and methods provided herein may detect whether a propeller is attached and/or locked to a propeller seat of a UAV prior to takeoff and/or flight of the UAV. In some instances, the UAV may be prevented from taking off if the propeller is not properly attached. In some instances, an alert may be provided to a user, for example by remote controller. The user may check and change the propeller as needed. When a propeller is properly attached and/or locked, the UAV may takeoff. When the proper propeller type and/or direction is attached, the UAV may be allowed to fly. If during flight, a propeller is damaged or loosened, the systems and methods provided herein may detect an error and direct the UAV to land. The systems and methods provided herein may cause a UAV to land upon detection of a potential error, which may reduce the likelihood of propellers flying off, or the UAV crashing.

It should be understood from the foregoing that, while particular implementations have been illustrated and described, various modifications can be made thereto and are contemplated herein. It is also not intended that the disclosure be limited by the specific examples provided within the specification. While the disclosure has been described with reference to the aforementioned specification, the descriptions and illustrations of the embodiments herein are not meant to be construed in a limiting sense. Furthermore, it shall be understood that all aspects of the disclosure are not limited to the specific depictions, configurations or relative proportions set forth herein which depend upon a variety of conditions and variables. Various modifications in form and detail of the embodiments of the disclosure will be apparent to a person skilled in the art. It is therefore contemplated that the disclosure shall also cover any such modifications, variations and equivalents.

What is claimed is:

1. A propulsion assembly for an unmanned aerial vehicle (UAV), said assembly comprising:
   a motor configured to rotate in a first direction;

a propeller seat configured to be driven by the motor to rotate in the first direction and to receive a propeller; and a sensor configured to collect sensing data useful for determining whether the propeller is locked to the propeller seat through a mechanical locking mechanism, without requiring operation of the motor.

2. The assembly of claim 1, wherein the propeller comprises a magnet and the sensor comprises a magnetometer configured to detect a magnetic field that is caused by the magnet.

3. The assembly of claim 2, wherein the magnetic field is generated by a shaft of the propeller seat which is magnetized by the magnet.

4. The assembly of claim 2, wherein the magnet is disposed within a cavity configured to receive a shaft of the propeller seat and wherein the magnetometer is disposed below the shaft of the propeller seat.

5. The assembly of claim 1, wherein the propeller seat comprises one or more electrical contacts that are configured to connect with one or more electrical contacts of the propeller when the propeller is locked to the propeller seat.

6. The assembly of claim 5, wherein the sensor is configured to detect a presence of an electric current in an electric circuit formed at least in part by the connection between the one or more electrical contacts of the propeller seat and the one or more electrical contacts of the propeller.

7. The assembly of claim 1, wherein the sensor comprises at least one of a proximity sensor, a pressure sensor, an optical sensor configured to detect a visual marker attached to the propeller, or an RFID reader configured to detect an RFID tag attached to the propeller.

8. The assembly of claim 1, wherein the sensing data is also useful for identifying a type of the propeller.

9. The assembly of claim 8, wherein the type of the propeller comprises a directionality of the propeller.

10. The assembly of claim 1, further comprising a second motor configured to rotate in a second direction and a second propeller seat driven by the second motor to rotate in the second direction, wherein the second propeller seat is configured to receive a different propeller.

11. The assembly of claim 1, further comprising one or more processors configured to receive the sensing data from the sensor and determine whether the propeller is locked to the propeller seat through the mechanical locking mechanism, without requiring operation of the motor.

12. A method for controlling an unmanned aerial vehicle (UAV) comprising:
obtaining sensing data from a sensor disposed at or near a propeller seat of the UAV, the propeller seat being configured to be driven by a motor;
determining, based on the sensing data, whether a propeller is locked to the propeller seat through a mechanical locking mechanism, without requiring operation of the motor; and
controlling the motor according to a result of the determination.

13. The method of claim 12, further comprising:
determining a type of the propeller based on the sensing data.

14. The method of claim 12, wherein the sensing data includes at least one of:
data characterizing a magnetic field caused by a magnet disposed at the propeller,
data indicating presence of an electric current in an electric circuit formed at least in part by a connection between one or more electrical contacts of the propeller seat and one or more electrical contacts of the propeller,
proximity data,
pressure data,
data indicating presence of a visual marker attached to the propeller, or
data indicating presence of an RFID tag attached to the propeller.

15. An unmanned aerial vehicle (UAV) comprising:
a body;
a motor arranged at the body and configured to rotate in a first direction;
a propeller seat arranged at the body and configured to be driven by the motor to rotate in the first direction and to receive a propeller;
a sensor configured to collect sensing data useful for determining whether the propeller is locked to the propeller seat through a mechanical locking mechanism, without requiring operation of the motor.

16. The UAV of claim 15, wherein the propeller comprises a magnet and the sensor comprises a magnetometer configured to detect a magnetic field that is caused by the magnet.

17. The UAV of claim 15, wherein the propeller seat comprises one or more electrical contacts that are configured to connect with one or more electrical contacts of the propeller when the propeller is locked to the propeller seat.

18. The UAV of claim 17, wherein the sensor is configured to detect a presence of an electric current in an electric circuit formed at least in part by the connection between the one or more electrical contacts of the propeller seat and the one or more electrical contacts of the propeller.

19. The UAV of claim 15, wherein the sensor comprises at least one of a proximity sensor, a pressure sensor, an optical sensor configured to detect a visual marker attached to the propeller, or an RFID reader configured to detect an RFID tag attached to the propeller.

20. The UAV of claim 15, wherein the sensing data is also useful for identifying a type of the propeller.

* * * * *